United States Patent
Han et al.

(10) Patent No.: US 11,010,595 B2
(45) Date of Patent: May 18, 2021

(54) FACIAL VERIFICATION METHOD AND APPARATUS

(71) Applicant: Samsung Electronics Co., Ltd., Suwon-si (KR)

(72) Inventors: Seungju Han, Seoul (KR); Minsu Ko, Suwon-si (KR); Deoksang Kim, Hwaseong-si (KR); Jae-Joon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/837,170

(22) Filed: Dec. 11, 2017

(65) Prior Publication Data

US 2018/0276454 A1   Sep. 27, 2018

(30) Foreign Application Priority Data

Mar. 23, 2017 (KR) .................. 10-2017-0036646
Apr. 19, 2017 (KR) .................. 10-2017-0050653
May 2, 2017  (KR) .................. 10-2017-0056145

(51) Int. Cl.
*G06K 9/00* (2006.01)
*G06K 9/46* (2006.01)

(52) U.S. Cl.
CPC ..... *G06K 9/00288* (2013.01); *G06K 9/00255* (2013.01); *G06K 9/00281* (2013.01); *G06K 9/4628* (2013.01)

(58) Field of Classification Search
None
See application file for complete search history.

(56) References Cited

U.S. PATENT DOCUMENTS

| 8,175,375 B2 | 5/2012 | Bonnery et al. |
| 2007/0122005 A1* | 5/2007 | Kage ................. G06K 9/00275 382/115 |

(Continued)

FOREIGN PATENT DOCUMENTS

| EP | 2 685 352 A2 | 1/2014 |
| EP | 2 685 352 A3 | 1/2014 |

(Continued)

OTHER PUBLICATIONS

Mo, Zhenyao, John P. Lewis, and Ulrich Neumann. "Face Inpainting with Local Linear Representations." BMVC. vol. 1. 2004.*

(Continued)

*Primary Examiner* — Vu Le
*Assistant Examiner* — Tracy Mangialaschi
(74) *Attorney, Agent, or Firm* — NSIP Law

(57) ABSTRACT

A facial verification method and apparatus is disclosed. The facial verification method includes detecting a face region in an input image, determining whether the detected face region represents a partial face, in response to a determination that the detected face region represents the partial face, generating a synthesized image by combining image information of the detected face region and reference image information, performing a verification operation with respect to the synthesized image and predetermined first registration information, and indicating whether facial verification of the input image is successful based on a result of the performed verification operation.

4 Claims, 19 Drawing Sheets

(56) References Cited

U.S. PATENT DOCUMENTS

| | | | | |
|---|---|---|---|---|
| 2009/0052747 | A1* | 2/2009 | Kamiyama | G06K 9/00281 382/118 |
| 2010/0067751 | A1* | 3/2010 | Aoki | G06K 9/00288 382/118 |
| 2012/0288166 | A1* | 11/2012 | Sun | G06K 9/00281 382/118 |
| 2012/0288167 | A1* | 11/2012 | Sun | G06K 9/00281 382/118 |
| 2013/0194455 | A1* | 8/2013 | Bigioi | G06K 9/00221 348/239 |
| 2013/0293456 | A1* | 11/2013 | Son | G06F 3/013 345/156 |
| 2016/0203305 | A1 | 7/2016 | Suh et al. | |
| 2016/0335482 | A1 | 11/2016 | Klare et al. | |
| 2017/0024608 | A1 | 1/2017 | Kons | |
| 2017/0046562 | A1* | 2/2017 | Juefei-Xu | G06K 9/00281 |
| 2017/0280394 | A1* | 9/2017 | Kim | G06F 1/1694 |

FOREIGN PATENT DOCUMENTS

| | | |
|---|---|---|
| JP | 2008-21169 A | 1/2008 |
| JP | 2008-181439 A | 8/2008 |
| JP | 2010-33199 A | 2/2010 |
| KR | 10-0959382 B1 | 5/2010 |
| KR | 10-1308347 B1 | 9/2013 |
| KR | 10-1373274 B1 | 3/2014 |
| KR | 10-2016-0087167 A | 7/2016 |

OTHER PUBLICATIONS

Storer, Markus, Martin Urschler, and Horst Bischof. "Occlusion detection for ICAO compliant facial photographs." Computer Vision and Pattern Recognition Workshops (CVPRW), 2010 IEEE Computer Society Conference on. IEEE, 2010.*

Vincent, J. M., J. B. Waite, and D. J. Myers. "Automatic location of visual features by a system of multilayered perceptrons." IEE Proceedings F-Radar and Signal Processing. vol. 139. No. 6. IET, 1992.*

Masi, Iacopo, et al. "Pose-aware face recognition in the wild."; 2016 IEEE Conference on Computer Vision and Pattern Recognition (CVPR). IEEE, 2016. (Year: 2016).*

Chopra, Sumit, Raia Hadsell, and Yann LeCun. "Learning a similarity metric discriminatively, with application to face verification." CVPR (1). 2005. (Year: 2005).*

Dhouib, Mofdi, and Sabeur Masmoudi. "Advanced Multimodal Fusion for Biometric Recognition System based on Performance Comparison of SVM and ANN Techniques." International Journal of Engineering Research 5.10 (2016): 807-814. (Year: 2016).*

Burgos-Artizzu, Xavier P., et al. "Real-time expression-sensitive hmd face reconstruction." SIGGRAPH Asia 2015 Technical Briefs. 2015. 1-4. (Year: 2015).*

Deng et al., "Graph Laplace for Occluded Face Completion and Recognition", *IEEE Transactions on Image Processing*, vol. 20 No. 8., Aug. 2011, (10 pages in English).

Extended European Search Report dated Jul. 25, 2018 in European Patent Application No. 18160785.4 (8 pages in English).

Liu, D. et al., "Illumination invariant face recognition", *Pattern Recognition*, vol. 38, Issue 10, Oct. 2005, pp. 1705-1716 (12 pages in English).

Sadimon, S. et al., "Computer Generated Caricature: A Survey", *Proceedings of the 2010 International Conference on Cyberworlds, Singapore, Singapore*, Oct. 2010, pp. 383-390 (8 pages in English).

Extended European Search Report dated Dec. 19, 2018 in corresponding European Patent Application No. 18160785.4 (10 pages in English).

* cited by examiner

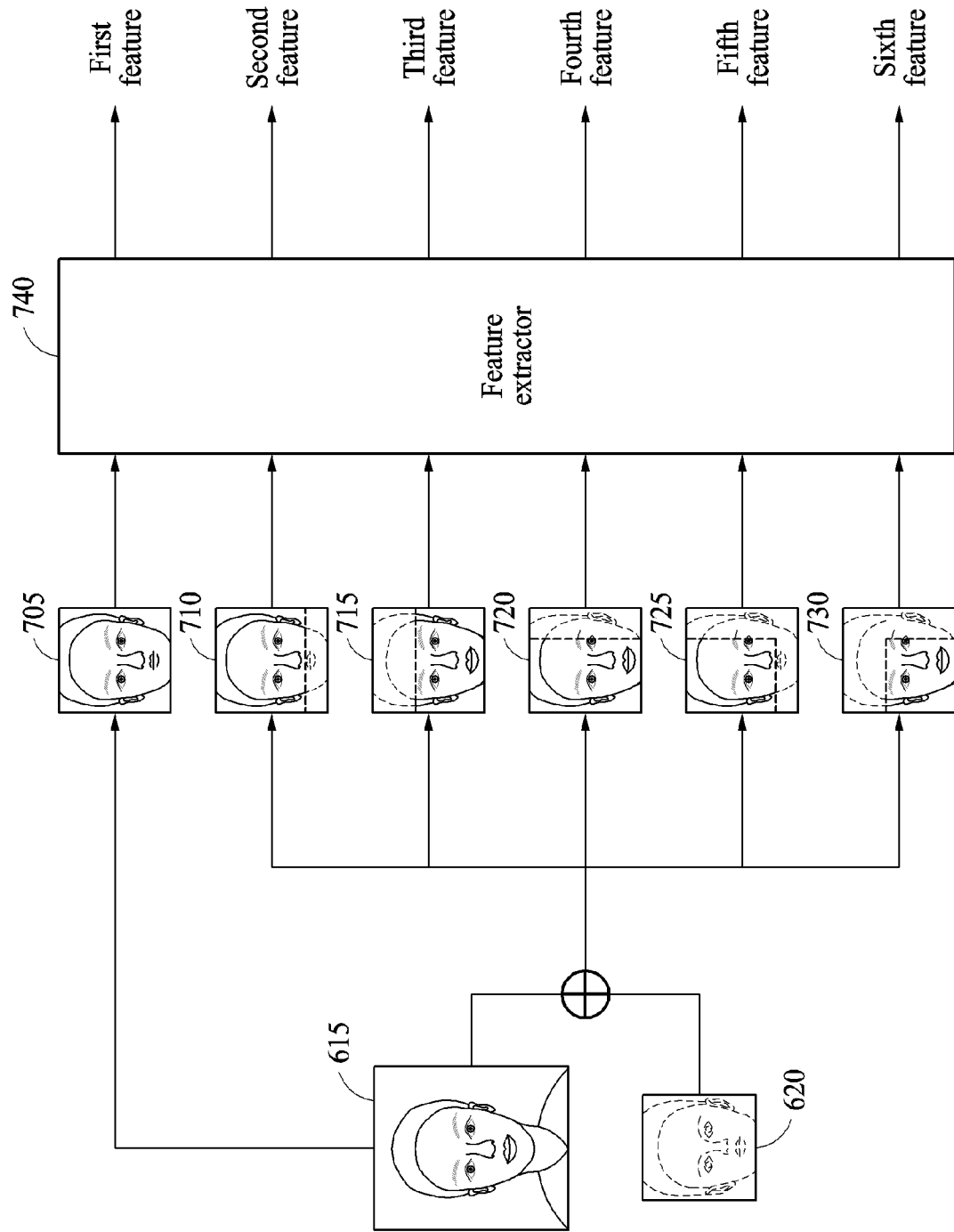

FACIAL VERIFICATION METHOD AND APPARATUS

CROSS-REFERENCE TO RELATED APPLICATION(S)

This application claims the benefit under 35 USC § 119(a) of Korean Patent Application No. 10-2017-0036646 filed on Mar. 23, 2017, Korean Patent Application No. 10-2017-0050653 filed on Apr. 19, 2017, and Korean Patent Application No. 10-2017-0056145 filed on May 2, 2017, in the Korean Intellectual Property Office, the entire disclosures of which are incorporated herein by reference for all purposes.

BACKGROUND

1. Field

The following description relates to facial verification technology.

2. Description of Related Art

A facial verification technology is a biometric authentication technology and may include determining whether a user is a valid user based on a face appearing in a still image or a video. Such facial verification technologies may verify a target without contact with the target.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a processor implemented facial verification method includes detecting a face region in an input image, determining whether the detected face region represents a partial face, in response to a determination that the detected face region represents the partial face, generating a synthesized image by combining image information of the detected face region and reference image information, performing a verification operation with respect to the synthesized image and predetermined first registration information, and indicating whether facial verification of the input image is successful based on a result of the performed verification operation.

The performing of the verification operation may further include selectively performing verification with respect to the detected face region and predetermined second registration information when the detected face region is determined to represent a full face and performing verification with respect to the synthesized image and the first registration information when the detected face region is determined to represent the partial face.

The performing of the verification with respect to the detected face region and the second registration information may include extracting a feature of the input image based on a difference between image information of the detected face region and a reference image that includes the reference image information, and determining whether the facial verification is successful based on a result of a comparing of the extracted feature and a select registered feature, corresponding to a full face, among a plurality of registered features.

The reference image information may correspond to image information of a select facial portion of a reference image, the select facial portion may correspond to a determined missing facial portion of the detected face region or determined partial face type of the detected face region.

The performing of the verification operation with respect to the synthesized image and the first registration information may include extracting a feature from a difference image, derived from the synthesized image and the reference image, and comparing the extracted feature to a registered feature of the first registration information.

The determining of whether the detected face region represents the partial face may be based on at least one determined location of the detected face region or at least one determined lacking facial portion based on predetermined locations of reference facial portions.

The determining of whether the detected face region represents the partial face may include determining that the detected face region represents the partial face in response to a determination that the detected face region includes a portion of a boundary of the input image.

The generating of the synthesized image may include generating the synthesized image by combining the image information of the detected face region and select image information, as the reference image information, of a reference image, where the select image information of the reference image may be image information of a portion of the reference image determined to correspond to another region of a full face distinguished from the represented partial face of the detected face region.

The portion of the reference image may be a remaining portion of the full face that is determined missing from the detected face region.

The determining of whether the detected face region represents the partial face may include determining that the detected face region represents the partial face in response to a determination that the detected face region does not include one or more reference facial landmarks respectively corresponding to at least one of plural predefined facial part regions.

The method may further include detecting a plurality of facial landmarks in the detected face region, and determining that the detected face region does not include the one or more reference facial landmarks may include comparing the detected plurality of facial landmarks to the one or more reference facial landmarks.

A detecting of one or more of the plurality of facial landmarks in the detected face region may be performed in the detecting of the face region to detect the face region.

A generating of the synthesized image may include generating the synthesized image by combining the image information of the detected face region and image information, as the reference image information, of a portion of a reference image corresponding to the at least one of the plural predefined facial part regions.

A location and a shape of the portion of the reference image, for the combining of the image information of the detected face region with the image information of the portion of the reference image, may be determined based on the at least one of the plural predefined facial part regions.

The verification operation with respect to the synthesized image and the first registration information may include extracting a feature of the synthesized image using a feature extractor, and determining whether the facial verification of the input image is successful based on a result of comparing the extracted feature and a registered feature, among a plurality of registered features, corresponding to a determined partial face type of the detected face region.

The method may further include determining the partial face type of the detected face region based on an analyzing of a plurality of facial landmarks in the detected face region with respect to one or more reference facial part regions.

The detecting of the face region may include detecting one or more of the plurality of facial landmarks.

The extracting of the feature of the synthesized image may include providing, to the feature extractor, image information of a difference between the synthesized image and a reference image that includes the reference image information.

The feature extractor may be a neural network including plural output layers respectively corresponding to plural partial face types.

The neural network may include a common feature extractor including one or more trained neural network layers configured to receive the detected face region and extract an intermediate feature, a first feature extractor including one or more trained neural network layers, connected to the common feature extractor, configured to receive the intermediate feature and extract full face feature information, in response to the detected face region being determined to represent a full face, and a second feature extractor including one or more trained neural network layers, connected to the common feature extractor, configured to receive the intermediate feature and extract partial face feature information, in response to the detected face region being determined to represent the partial face, where the performing of the verification operation may include comparing the full face feature information to predetermined second registration information or comparing the partial face feature information with the first registration information.

The plurality of registered features may include a corresponding registered feature for each of plural partial face types.

The plural partial face types may be respectively different partial face types.

The reference image information may be obtained from a reference image, and the reference image may be an image determined based on training images used to train a feature extractor used in the verification operation to extract a feature from the synthesized image for comparison with the first registration information.

The feature extractor may include a trained neural network and the method may further include training the neural network to extract face image features using the training images and determining the reference image from the training images.

The method may further include determining whether an occluded region is present in the detected face region, where, in response to a determination that the occluded region is present in the detected face region, the generating of the synthesized image may be further performed by replacing a portion of the image information of the detected face region, where the occluded region is determined to be present, with image information of a portion, corresponding to the occluded region, of a reference image, and where the reference image includes the reference image information.

The method may further include detecting a plurality of facial landmarks in the detected face region, and generating the image information of the detected face region by adjusting the detected face region based on determined locations of the detected plurality of facial landmarks.

In one general aspect there is provided a non-transitory computer-readable storage medium storing instructions, which when executed by computing hardware, cause the computing hardware to implement one or more, any combination, or all operations described herein.

An image representing the face region may not be provided to a user while the facial verification method is being performed.

A guide, for encouraging a positioning of a user for a capturing of the input image, may not be displayed to the user while the facial verification method is being performed.

In one general aspect, a facial verification apparatus includes a processor configured to detect a face region in an input image, determine whether the detected face region represents a partial face, in response to the detected face region being determined to represent the partial face, generate a synthesized image by combining image information of the detected face region and reference image information, perform a verification operation with respect to the synthesized image and predetermined first registration information, and indicate whether facial verification of the input image is successful based on a result of the performed verification operation.

For the performing of the verification operation, the processor may be configured to selectively perform verification with respect to the detected face region and predetermined second registration information when the detected face region is determined to represent a full face and perform verification with respect to the synthesized image and the first registration information when the detected face region is determined to represent the partial face.

The reference image information may correspond to image information of a select facial portion of a reference image, where the select facial portion may correspond to a determined missing facial portion of the detected face region or determined partial face type of the detected face region.

For the performing of the verification operation with respect to the synthesized image and the first registration information, the processor may be configured to derive a difference between the synthesized image and the reference image, extract a feature from the derived difference, and compare the extracted feature to a registered feature of the first registration information.

For the determining of whether the detected face region represents the partial face, the processor may be configured to determine that the detected face region represents the partial face in response to a determination by the processor that the detected face region includes a portion of a boundary of the input image.

The processor may be configured to generate the synthesized image by combining the image information of the detected face region and select image information, as the reference image information, of a reference image, where the select image information of the reference image may be image information of a portion of the reference image determined by the processor to correspond to another region of a full face distinguished from the represented partial face of the detected face region.

The portion of the reference image may be a remaining portion of the full face that is determined by the processor to be missing from the detected face region.

For the determining of whether the detected face region represents the partial face, the processor may be configured to determine that the detected face region represents the partial face in response to a determination by the processor that the detected face region does not include one or more reference facial landmarks respectively corresponding to at least one of plural predefined facial part regions.

The processor may be further configured to detect a plurality of facial landmarks in the detected face region, and determine that the detected face region does not include the one or more reference facial landmarks by comparing the detected plurality of facial landmarks to the one or more reference facial landmarks.

The processor may be configured to detect one or more of the plurality of facial landmarks in the detected face region when performing the detecting of the face region.

The processor may be configured to generate the synthesized image by combining the image information of the detected face region and image information of a portion of a reference image corresponding to the at least one of the plural predefined facial part regions.

For the verification operation with respect to the synthesized image and the first registration information, the processor may be configured to extract a feature of the synthesized image using a feature extractor, and to determine whether the facial verification of the input image is successful based on a comparing by the processor of the extracted feature and a registered feature, among a plurality of registered features, corresponding to a determined partial face type of the detected face region.

The processor may be further configured to determine whether an occluded region is present in the detected face region, and in response to a determination that the occluded region is present in the detected face region and for the generating of the synthesized image, the processor may be further configured to replace a portion of the image information of the detected face region, where the occluded region is determined to be present, with image information of a portion, corresponding to the occluded region, of a reference image, and where the reference image may include the reference image information.

The apparatus may further include a camera configured to capture a face image comprising the face region, where the facial verification apparatus may be further configured to not display the captured face image while a facial verification process, including the detecting of the face region, is being performed.

In one general aspect, a computing apparatus includes a camera configured to obtain a face image of a user, a display configured to be observable by the user during the obtaining of the face image, and a processor configured to perform a facial verification by comparing the obtained face image and a registered face image, wherein the computing apparatus does not display the obtained face image on the display while the facial verification is being performed.

The processor may be configured to perform the facial verification when the obtained face image includes full face information of the user and when the obtained face image includes only partial face information of the user.

In response to the obtained face image including only partial face information of the user, the processor may be configured to generate a synthesized image of the obtained face image and a predefined reference image based on a determined type of the partial face information, and perform the facial verification based on the synthesized image.

In one general aspect, a processor implemented facial verification method includes detecting a face region in an input image, and performing facial verification of the input image by selectively performing a first verification operation of comparing a predetermined first registration feature and a feature extracted from a synthesized face, which includes image information of the detected face region and padding information, and performing a second verification operation of comparing a predetermined second registration feature and a feature extracted from the detected face region, where the second registration feature is a feature extracted from a registration image and the first registration feature is a feature extracted from a synthesized registration face that is based on the registration image.

The method may further include determining whether the detected face region represents a partial face, where the selective performing of the first verification operation and the second verification operation may further include selecting to perform the first verification operation when the detected face region is determined to represent the partial face and selecting to perform the second verification operation when the detected face region is not determined to represent the partial face.

The padding information may correspond to image information of a select facial portion of a reference image, where the select facial portion may correspond to a determined missing facial portion of the detected face region when the detected face region is determined to represent a partial face.

The method may further include performing a first registration operation of extracting the first registration feature from the synthesized registration face, which includes partial image information of the registration image and registration padding information, and performing a second registration operation of extracting the second registration feature from the registration image.

The padding information and the registration padding information may include a same reference image information.

In a general aspect, a facial verification apparatus includes a common feature extractor including one or more trained neural network layers configured to receive a face image and output an intermediate feature, a first feature extractor including one or more trained neural network layers, connected to the common feature extractor, configured to receive the intermediate feature and extract a facial verification feature, in response to the face image being determined to include full face information, and a second feature extractor including one or more trained neural network layers, connected to the common feature extractor, configured to receive the intermediate feature and extract another facial verification feature, in response to the face image being determined to represent a partial face.

The apparatus may include a processor configured to selectively perform a first verification operation, when the face image is determined to include the full face information, by comparing the facial verification feature and an extracted feature of a captured verification image and a second verification operation, when the face image is determined to include the partial face information, by comparing the other facial verification feature with an extracted feature of a synthesized face based on the verification image, and indicate whether facial verification of the input image is successful based on a result of the performed first or second verification operations.

The apparatus may include a processor configured to, in a sequential order, perform a first registration operation of providing a registration face to the common feature extractor and to extract the facial verification feature from the first feature extractor and perform a second registration operation of providing the synthesized face to the common feature extractor and to extract the other facial verification feature.

The common feature extractor may include one or more convolutional layers.

The common feature extractor may include one or more fully-connected or dense layers.

The first feature extractor and the second feature extractor may respectively each include one or more fully-connected or dense layers.

The second feature extractor may be configured as a plurality of separate feature extractors, where each of the second feature extractors may be configured to extract features of different types of partial registration face information.

In a general aspect, a facial verification apparatus includes a common feature extractor including one or more trained neural network layers configured to extract a first intermediate feature with respect to a registration face, including full face information, and one or more respective second intermediate features with respect to one or more synthesized faces that each include respective partial face information of the registration face, a first feature extractor including one or more trained neural network layers, connected to the common feature extractor, configured to receive the first intermediate feature and extract a full facial verification feature, and one or more second feature extractors including one or more trained neural network layers, connected to the common feature extractor, configured to respectively receive the one or more respective second intermediate features and extract respective partial facial verification features.

The extraction of the first intermediate feature and the extraction of the one or more respective second intermediate features may be performed in parallel and/or the extraction of the full facial verification feature and the extraction of the respective partial facial verification features are performed in parallel.

The apparatus may include a processor configured to selectively perform a first verification operation, when a captured face image is determined to represent a full face, by comparing the full facial verification feature with an extracted feature of the captured face image using the common extractor and the first extractor, and perform a second verification operation, when the captured face image is determined to represent a partial face, by comparing at least one of the respective partial facial verification features with an extracted feature of a synthesized verification face based on the captured face image using the common extractor and at least one of the one or more second feature extractors, and indicate whether facial verification of the input image is successful based on a result of the performed first or second verification operations.

In a general aspect, a computing apparatus includes a display, a camera configured to capture a face image of a target, and a processor configured to perform a facial verification by comparing the captured face image and a registered face image, where the computing apparatus is further configured to not display the captured face image on the display while the facial verification is being performed, and where the processor is configured to perform the facial verification when the captured face image represents a full face and when the captured face image represents a partial face.

The processor may be further configured to determine whether the captured face image represents a partial face, to generate a synthesized face of the captured face image and a select reference image information based on a determined, in response to the captured face image being determined to represent the partial face, partial face type of the captured face, and to perform the facial verification based on the synthesized face.

Other features and aspects will be apparent from the following detailed description, the drawings, and the claims.

BRIEF DESCRIPTION OF THE DRAWINGS

FIGS. 7A through 7D are diagrams illustrating examples of a method of extracting registered features in a face registration process.

Figure 1A:
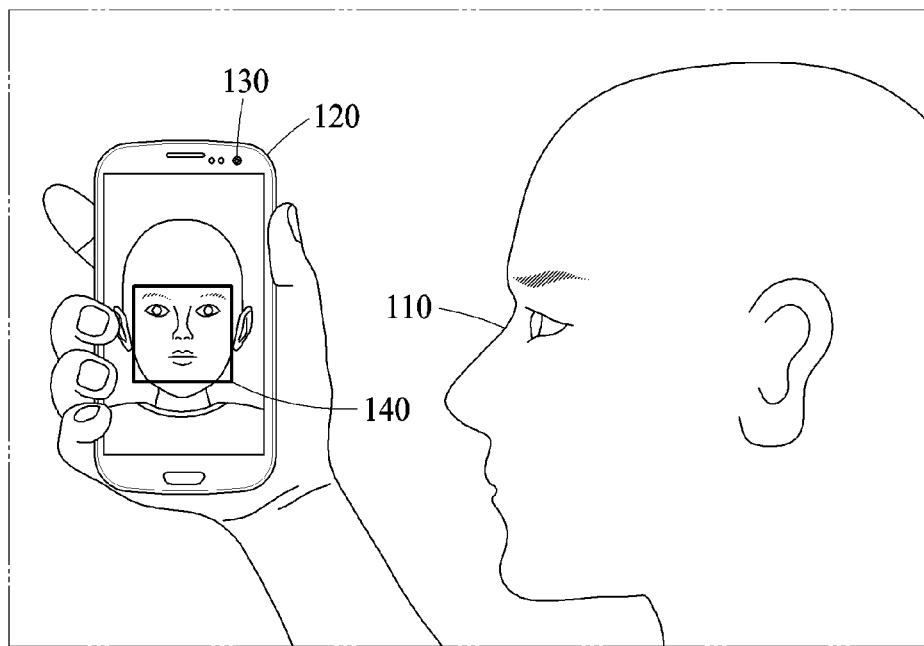
FIGS. 1A and 1B are diagrams illustrating examples of a facial verification.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. For example, as used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, components or one or more combinations/groups thereof in one or more example embodiments, but do not preclude the presence or addition of one or more other features, integers, operations, elements, components, and/or combinations/groups thereof in alternative embodiments, nor the lack of such stated features, integers, operations, elements, and/or components, and/or combinations/groups in further alternative embodiments unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Figure 1B:
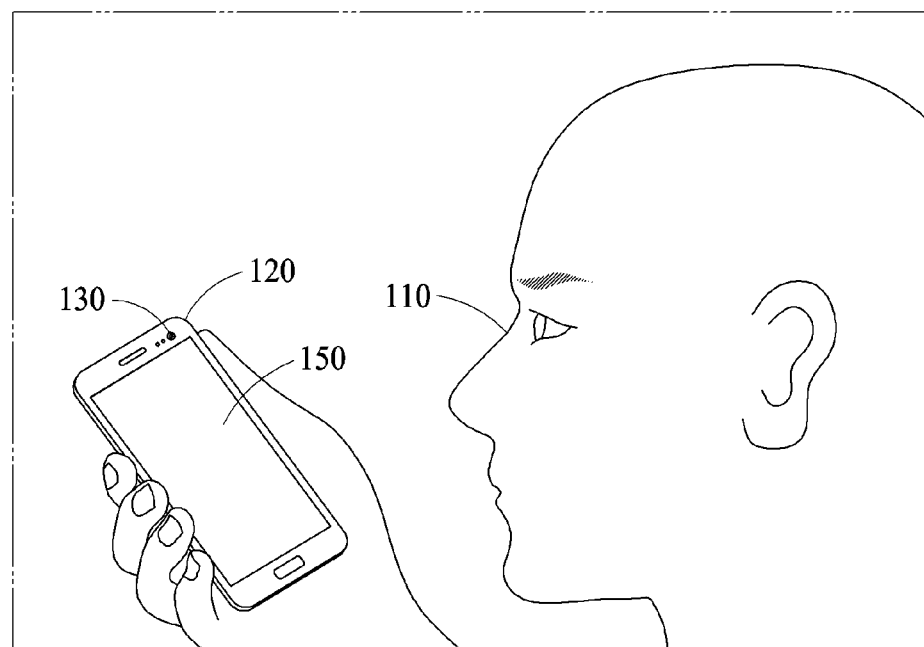
Figure 2A:
FIGS. 2A through 2D are diagrams illustrating examples of a partial face image.
Figure 2B:
Figure 2C:
Figure 2D:

FIGS. 1A and 1B are diagrams illustrating examples of a facial verification.

A facial verification refers to a verification method used to determine whether a user is a valid user based on face information of the user, and verify a valid user in, for example, user log-in, payment services, and access control. Referring to FIG. 1A, a facial verification apparatus configured to perform such a facial verification is included in, or represented by, a computing apparatus 120. The computing apparatus 120 includes, for example, a smartphone, a wearable device, a tablet computer, a netbook, a laptop computer, a desktop computer, a personal digital assistant (PDA), a set-top box, a home appliance, a biometrics-based door lock, a security device, and a vehicle start device.

The computing apparatus 120 may determine whether a user 110 attempting to have access to the computing apparatus 120 through facial verification is a valid user or not. For example, in a case in which the user 110 attempts at a user authentication in the computing apparatus 120, e.g., to cancel a lock state of the computing apparatus 120, the computing apparatus 120 obtains a face image of the user 110 using an image acquirer, for example, a camera 130 as illustrated, analyzes the obtained face image, and determines whether to cancel the lock state of the computing apparatus 120 based on results of the analyzing of the obtained face image. In such an example, if a determined similarity between features extracted from a registration image and feature extracted from a verification image meets a predetermined threshold, then the user may be determined to be a valid user of the computing apparatus 120, the user may be permitted to gain access to a restricted area, or the user may be authorized to implement a financial transaction or payment, etc. The user may be notified of the successful verification through the display 150, or the example further operations may merely be available through the display 150 thereby inferring the successful verification.

In one example, the face image captured through the camera 130 by the user 110 for the facial verification is acquired through user interaction with the display 150 of the computing apparatus 120, such as where a face image displayed on the display screen 150 functions as a preview image for an ultimate capturing of the face image that will be analyzed in the registration and/or verification operation. For example, by referring to the preview image, the user 110 may adjust the positioning of the computing apparatus 120 to capture a facial type to be input for the facial verification corresponding to the encouragement provided by display 150 through the preview image.

In one example, the computing apparatus 120 detects a face region 140 in the obtained face image, and extracts a feature from the face region 140 using a feature extractor. The computing apparatus 120 determines the user authentication to be a success or a failure based on a result of comparing the extracted feature and the example registered feature, of a valid user, registered in a face registering process, e.g., of the same or different computing apparatus 120. The feature extractor refers to a hardware implemented model configured to output feature information, for example, a feature, feature vector, or feature map, based on input information. Though not limited thereto, in an example, the feature extractor refers to a trained neural network, trained in advance based on training data. In an example, the example neural network may be a single trained neural network, or may be made up of multiple trained neural networks. In the above example, in response to the user authentication being determined to be successful, the user 110 may successfully cancel a lock mode of the computing apparatus 120. Conversely, in response to the user authentication being determined to be unsuccessful, the computing apparatus 120 may be maintained or continue to operate in the lock mode, or the user may not be permitted to gain access to restricted area, or the user may not be permitted to perform financial or payment operations. A valid user registers, in advance, a face of the valid user in the computing apparatus 120 in a face registration process, and the computing apparatus 120 stores, e.g., locally, remotely, or in a cloud storage, resulting registered information to identify the valid user. For example, a face image of a valid user or a feature extracted from the face image may be stored as registration information of the valid user.

For facial verification, at least a face of the user 110 may be captured using the example camera 130. Here, in response to the face being captured being partially out of a field of view (FoV) of the camera 130, an image of a partial face, in lieu of a full face, may be obtained. For example, as illustrated in FIG. 1B, where the user 110 may attempt the facial verification while holding the computing apparatus 120 at an angle, an image of only a partial face may be obtained because a full face is not within the FoV of the camera 130. Dissimilar to the example illustrated in FIG. 1A, where a full face image may be captured or the full face image captured after visual feedback or encouragement through the display of the preview image on the display 150, the example of FIG. 1B may correspond to the case in which only a partial face is obtained in the facial verification process, which may occur in a relatively great number of cases. Briefly, though FIG. 1A has been discussed as an example where a full face image is captured or full face image captured through visual feedback or encouragement through the display 150, it is noted that even when such visual feedback or encouragements are provided still only a partial face image may be captured, i.e., an image of the user 110 face having less face information than the example full face image.

Thus, though the user 110 may tend to attempt to obtain the full face in lieu of the partial face for the facial verification, when such attempts fail or in the case in which the example preview image is not provided as visual feedback or encouragement to the user 110, the user 110 may not be able to know whether the full face or the partial face was obtained and typical computing apparatuses may perform facial verification on the captured partial face rather than a full face image without high success rates or without capabilities to perform accurate verifications on only partial face images. Thus, the user 110 may not readily adjust the position of the camera, or position of the user relative to the camera, so the camera can obtain the full face, and typical computing apparatuses may not be able to perform verification of partial face images with reasonable accuracies. Thus, there exist technological problems in such typical verification technological approaches, at least in that typical verification approaches may result in false rejections and typical computing apparatuses, for example, may not properly operate based on the actual accuracy or veracity of the underlying subject under review. As only non-limiting examples, discussions of one or more technological solutions to such failings of current approaches are provided below, and thus, may provide one or more solutions in the computing apparatus 120 that enhance the recognition rate during face verification by performing face verification that may be less sensitive to only partially captured face images, or may be more robust against missing or non-captured facial aspects, using the computing apparatus 120, as further discussed below in FIGS. 2A-14.

FIGS. 2A through 2D are diagrams illustrating examples of captured partial face images. An example image illustrated in each of FIGS. 2A through 2D includes a partial face in which some of the facial parts of a full face region are not included. A partial face image, or image information of a partial face region, may include a smaller number of features or identifiers to be used to identify a user compared to a full face image, or image information of a full face region, and thus typical facial verification performed using such partial face images may generally have lower accuracies compared to typical facial verification performed using a full face image. However, as noted above, for various reasons a full face may not always be captured or input for facial verification, and thus the computing apparatus 120 and corresponding operations described herein provide face verification with partial face images with increased facial verification accuracies over the typical facial verification approaches provided only partial images, i.e., despite the input or capturing of only a partial face. Again as an example, in a case in which a preview image is not provided as visual feedback or encouragement to the user in the facial verification process as illustrated in FIG. 1B, the partial face image may frequently be obtained for facial verification. In such a case, despite an input or capturing of such a partial face image, one or more embodiments may provide increased facial verification accuracies over previous approaches that are designed to perform facial verification solely based on captured full face verification images and/or full face registration images.

Figure 3:
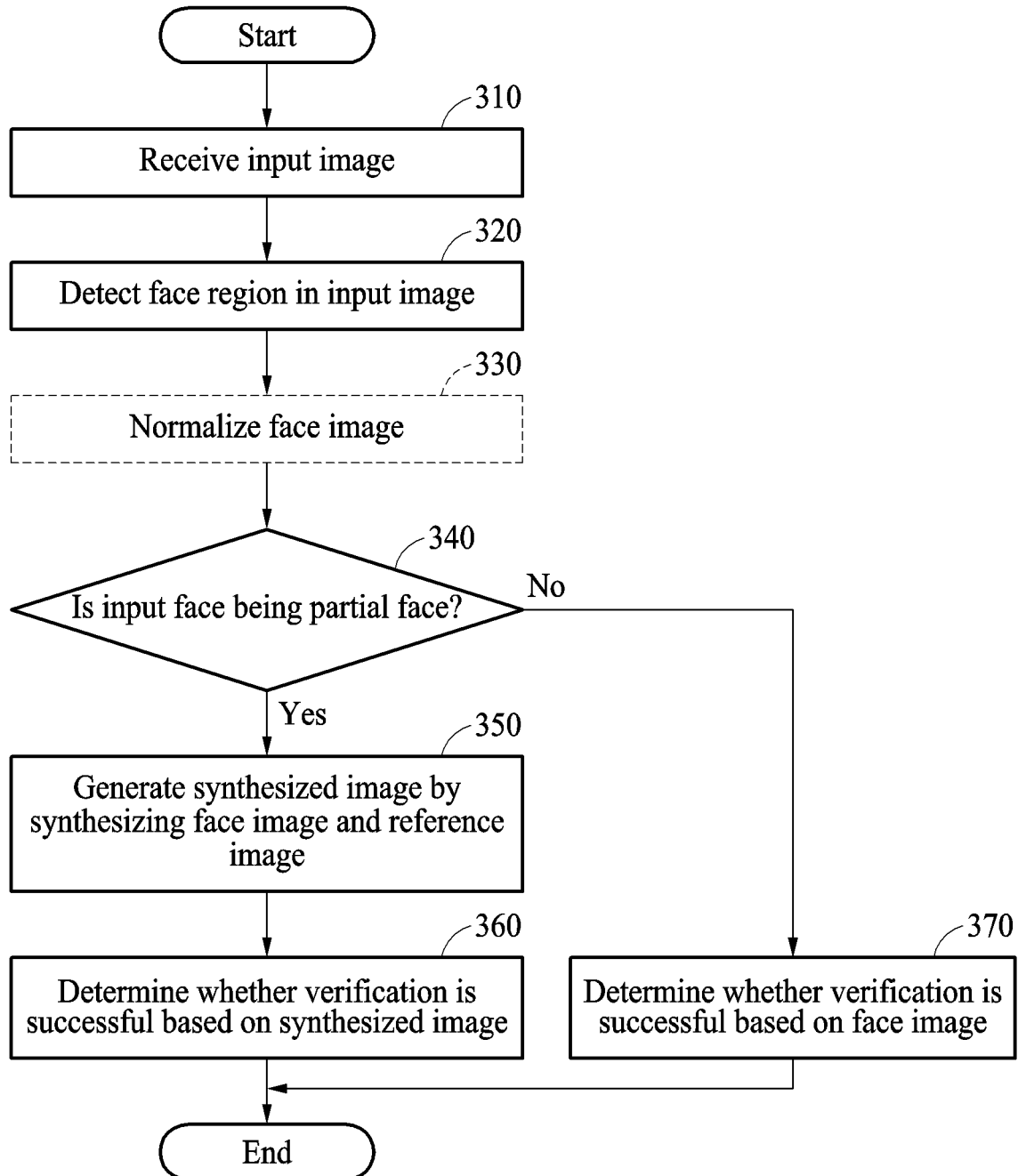
FIGS. 3 through 5 are flowcharts illustrating an example of a facial verification method.
Figure 4:
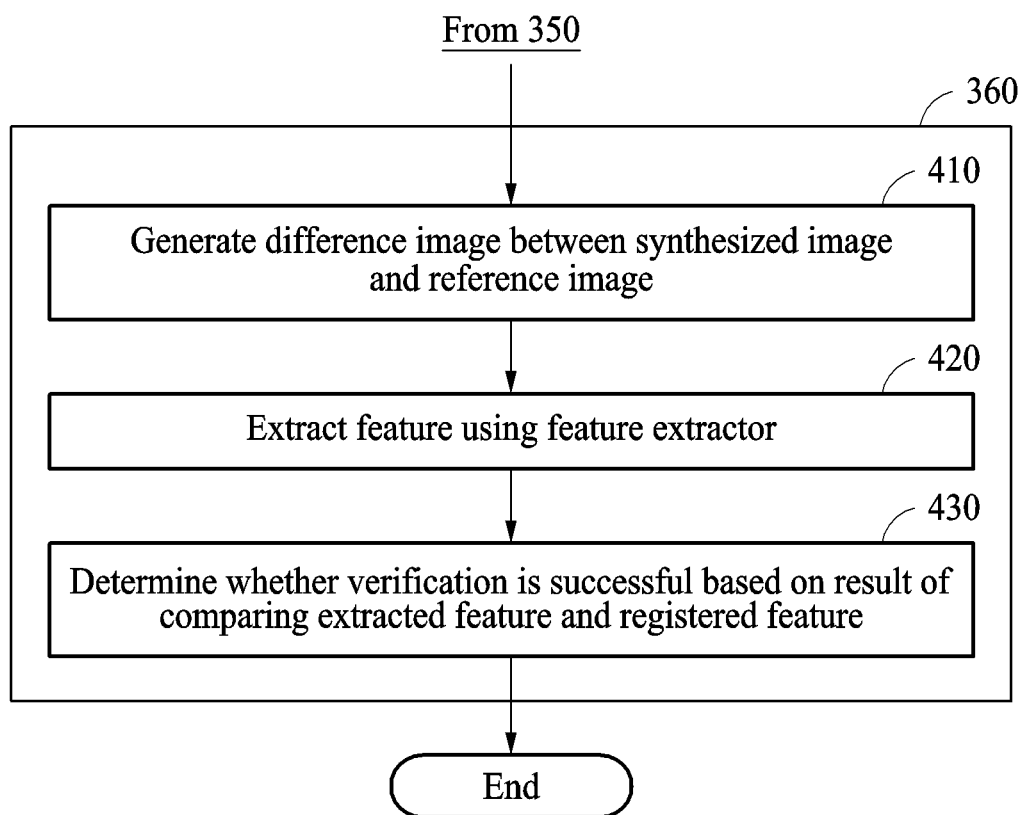
Figure 5:
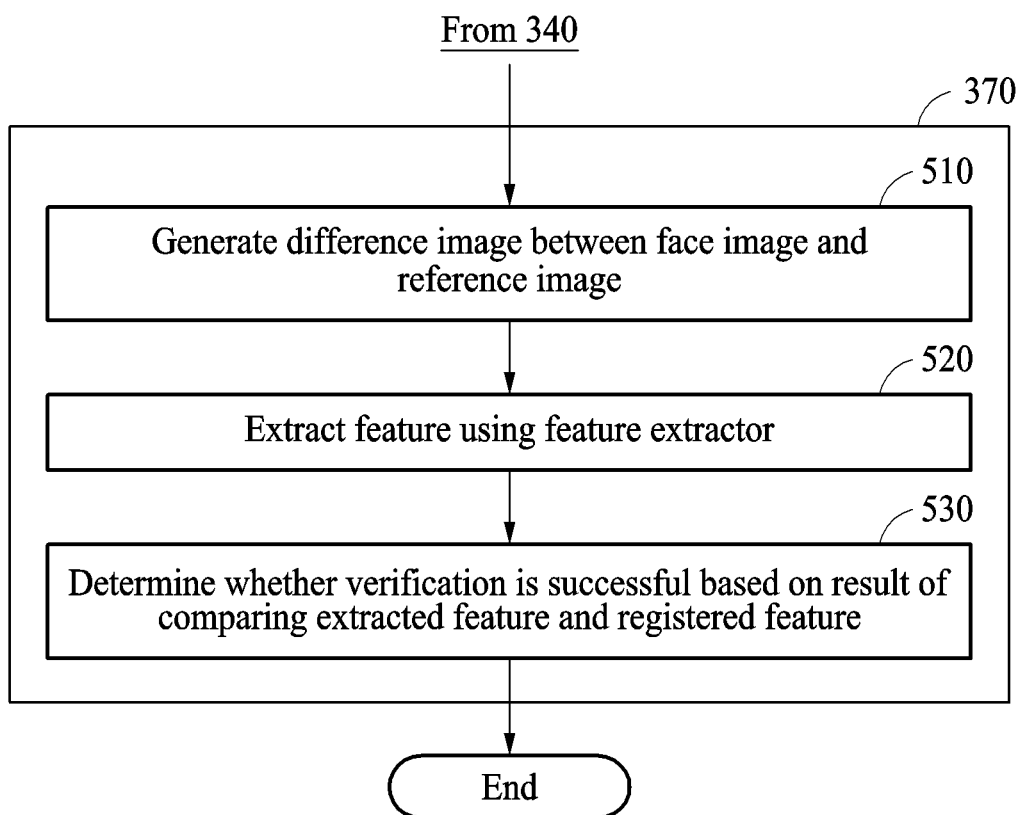

FIGS. 3 through 5 are flowcharts illustrating an example of a facial verification method. It should also be noted that in some alternative implementations, the operations/acts noted may occur out of the order noted in the figures. For example, two successive operations to be described with reference to FIGS. 3, 4, and 5 may be performed substantially concurrently, or the operations may be performed in the reverse order or other orders depending on the functions or acts involved.

Figure 12:
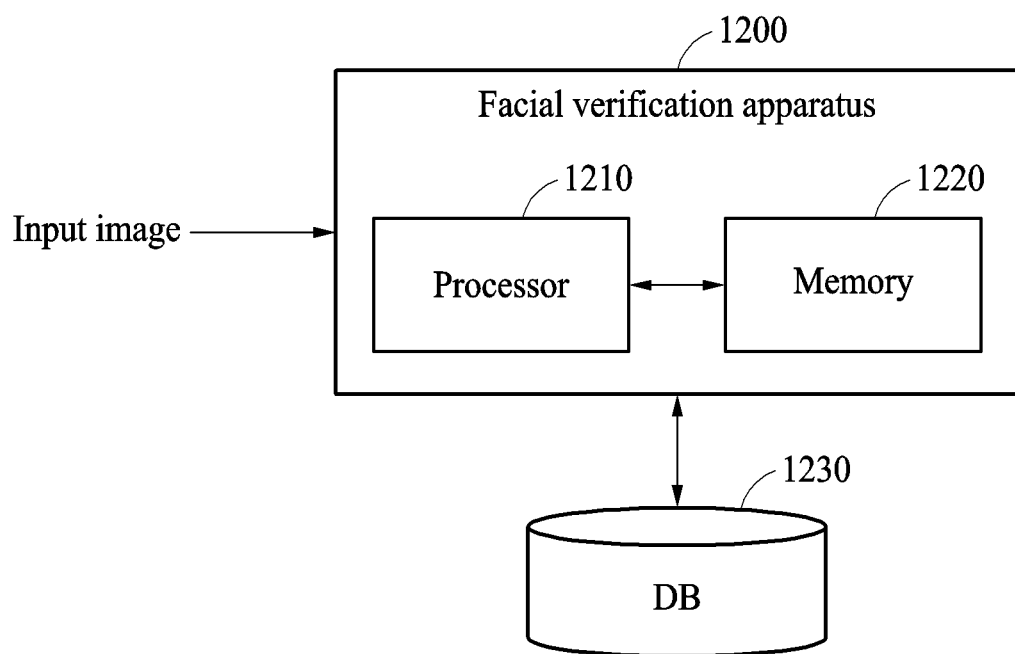
FIG. 12 is a diagram illustrating an example of a facial verification apparatus.
Figure 13:
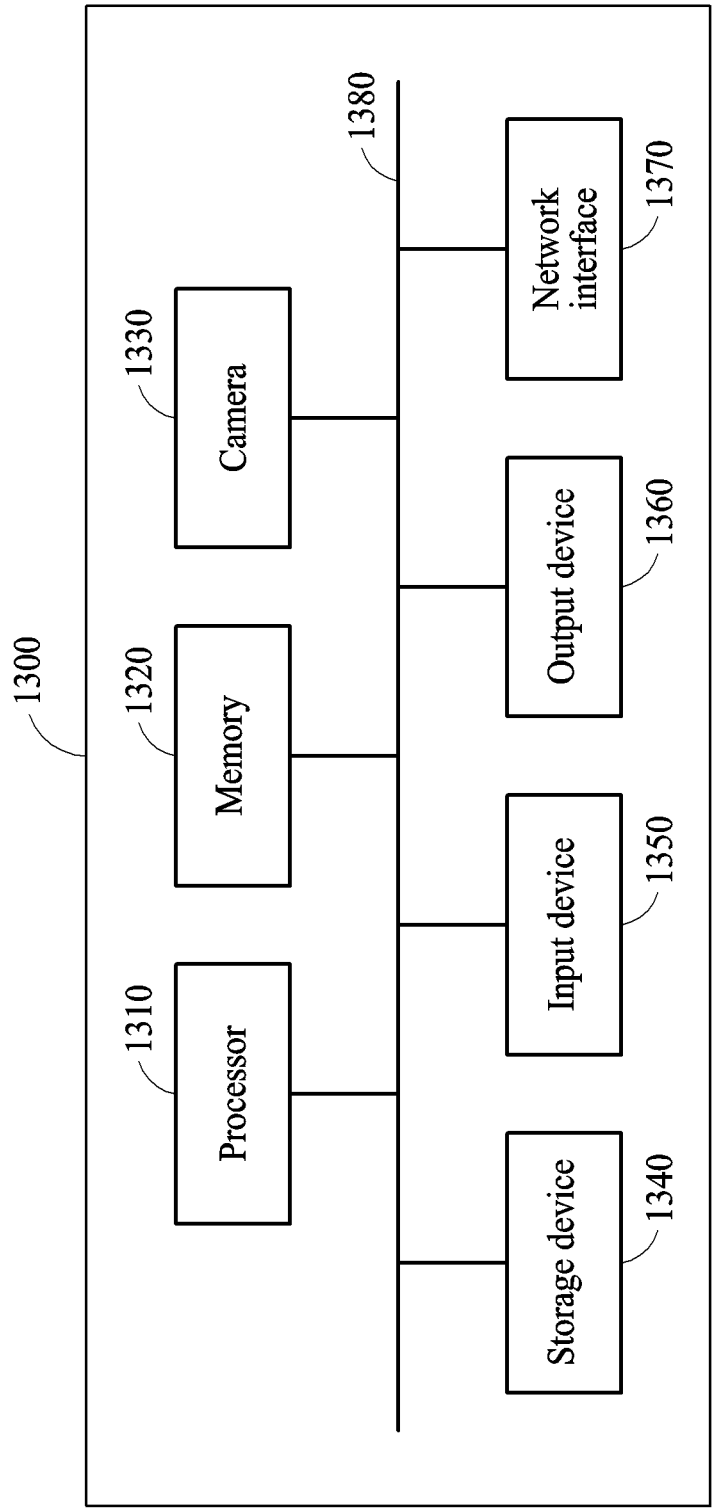
FIG. 13 is a diagram illustrating an example of a computing apparatus.
Figure 14:
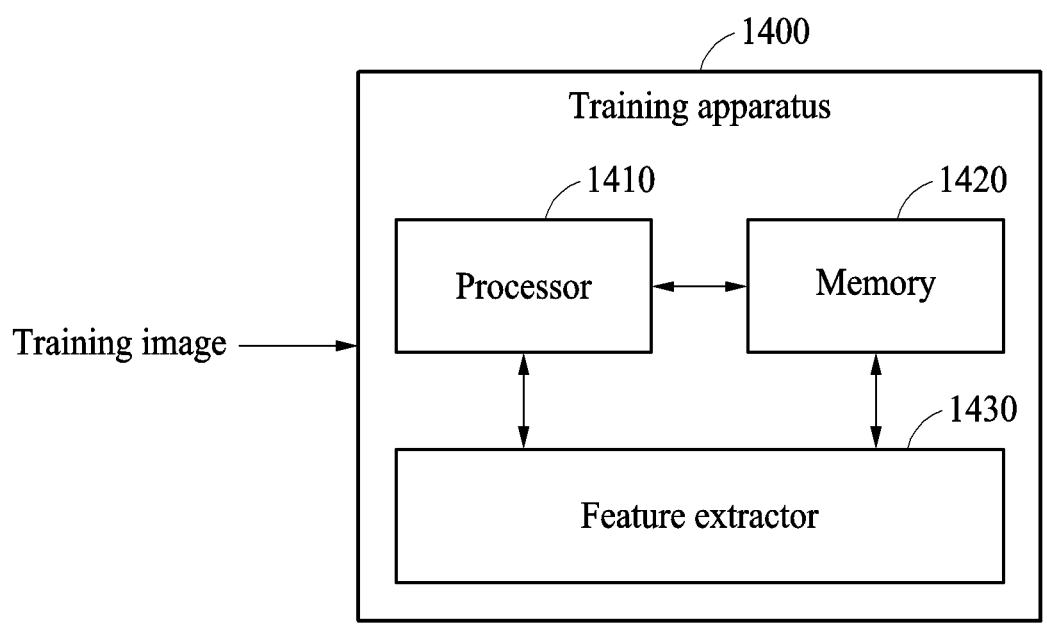
FIG. 14 is a diagram illustrating an example of a training apparatus.

In examples, such as the computing apparatus 120 of FIG. 1, the facial verification apparatus 1200 of FIG. 12, computing apparatus 1300 of FIG. 13, and training apparatus 1400 of FIG. 14, each of which herein can individually and collectively be referred to as respective facial verification apparatuses, each facial verification apparatus includes one or more processors configured to perform face verification based on one or more verification images and to output a verification result, or perform further operations based on the verification result, and/or perform face registration based on one or more registration images. The verification result indicates, e.g., either through explicit or inferential indications, whether a face included in the verification image corresponds to a valid user, for example. For example, when the face included in the verification image corresponds to the valid user, the verification result may include information indicating that verification has succeeded, and when the face included in the verification image does not correspond to the valid user, the verification result may alternatively include information indicating that the verification has failed. Alternatively, such as where face verification is automatically performed or performed in a background operation, e.g., without request or potential knowledge of the user, a successful or failed verification result may not be explicitly reported to the user, but the successful or failure indications may be through inferential operations to control/institute additional operations (or non-operation of the same), or output results may be explicitly indicated to another device or server that may receive or monitor results of the face verification or results of face verifications of one or more captured faces from one or more such facial verification apparatuses. Thus, the verification result may be indicated through, and used for, implementing or initiating of further processing of the facial verification apparatus, such as further processing operations in which user verification may be beneficial or required. As only examples, when the face included in the verification image is verified as a face of the valid user by the facial verification apparatus, the facial verification apparatus may unlock a user interface of the facial verification apparatus, such as when the facial verification apparatus is a user terminal, e.g., a smart phone or tablet, and the unlocking enables the user to access additional information or perform additional functions of user terminal, or the facial verification apparatus may control or indicate to an external device to permit entry of a user to a restricted area due to the face verification, or may authorize financial or payment transactions to proceed or be initiated, as well as alternative operations or processes depending on embodiment.

The face verification is performed by comparing information on one or more verification images to information on one or more registration images. For example, a valid user registers a face image with the facial verification apparatus through the capturing of a registration image, e.g., by the facial verification apparatus, either automatically or upon user control. As non-limiting examples, the processor of the facial verification apparatus may be one or more processors of the facial verification apparatus that control additional operations of the example user terminal, or may be specialized processors specially configured for the face verification, e.g., as a GPU, reconfigurable processor, or specialized neural network or machine learning accelerated processor. When in the verification process of the facial verification apparatus the input image may be referred to as the verification image, while in the registration process of the facial verification apparatus the input image may be referred to as the registration image. In the registration process, the facial verification apparatus extracts features from the face of the valid user and stores the extracted features. The example neural network configuration for extracting features may also be trained previously using training data. When the user registration is completed, and when a verification image is received, the facial verification apparatus may analyze the verification image, extract feature(s) from the face of the user in the verification image, and perform the face verification by comparing the feature(s) extracted from the verification image and feature(s) of the registration image(s) stored in advance based on a verification threshold, for example.

The facial verification apparatus may be configured to perform one or more or all neural network verification trainings, registration operations herein without verification, one or more or all verification operations herein without performing the registration, or may be configured to perform any one or any combinations of the training, registration operations, and verification operations. In an example, one facial verification apparatus may capture a registration image, that facial verification apparatus or another facial verification apparatus may perform image registration, and that facial verification apparatus, the other facial verification apparatus, and/or still another facial verification apparatus may capture the verification image, and any of the facial verification apparatuses or still a further facial verification apparatus may perform the verification of the verification image based on the registered image, e.g., as registered and stored by any of such facial verification apparatuses. Any of the facial verification apparatus may train the extractor or verification models or neural networks, or still another facial verification apparatus may perform the training. Such facial verification apparatuses may be in communication and share, or respectively provide from respective storing of the same, any trained parameters, any registration image(s), any other image registration information including corresponding extracted features, any verification images, any other verification information including corresponding extracted features, and/or results validation results of the verification processes. Thus, though examples below may refer to a facial verification apparatus acquiring a registration image, performing registration, acquiring a verification image, and performing verification as well as additional operations such as the training or other operations, embodiments are not limited to a single facial verification apparatus generating all such data, performing all such operations, or authorizing or implementing further operations of functions of a/the user device based on success or non-success results of the verification.

Accordingly, referring to FIG. 3, in operation 310, a facial verification apparatus receives an input image. The input image refers to an image input to the facial verification apparatus, which is a target for a facial verification. The input image is obtained by an image acquirer, for example, a digital still camera and a video camera. Herein, the facial verification apparatus may also perform preprocessing on the received input image. The preprocessing may include at least one operation to process the input image to be more suitable for the facial verification. The preprocessing may include, for example, removing noise included in the input image, increasing a contrast of the input image, deblurring the input image, removing a background region from the input image, performing warping to correct a distortion included in the input image, and binarizing the input image. Hereafter references to the "input image" may be understood to refer to the input image on which image preprocessing has been performed when the preprocessing is performed and understood to refer to the input image without image preprocessing when the preprocessing is not performed, depending on embodiment.

In operation 320, the facial verification apparatus detects a face region in the input image. The facial verification apparatus detects the face region in the input image using, for example, a Haar-based cascade adaboost classifier. However, examples are not limited to the example described in the foregoing, and the facial verification apparatus may detect the face region in the input image using various methods to detect a face region. In one example, a face image corresponding to the face region, which is extracted from the input image, has a form of a patch image.

In operation 330, the facial verification apparatus selectively normalizes the face image corresponding to the face region. In one example, the facial verification apparatus detects facial landmarks in the detected face region, and normalizes the input image based on the detected facial landmarks. Such normalization may include, for example, cropping the face image from the input image, matching a location of a facial landmark in the face image to a predefined corresponding reference landmark location, such as with respect to a reference image, and/or adjusting a size of the face image.

The facial verification apparatus detects the facial landmarks in the face region using a landmark detection method based on an active contour model (ACM), an active shape model (ASM), an active appearance model (AAM), a supervised descent method (SDM), and/or a neural network model. The facial landmarks refer to feature points in/of one or more main or major facial parts, for example, eyebrows, eyes, a nose, lips, a chin, ears, or one or more facial contours, to identify the facial parts. In an example, the facial verification apparatus may match locations of the facial landmarks to the reference landmark locations by performing an affine transformation on the face region based on the detected facial landmarks. Such an affine transformation may be performed to map a vector space indicated by the locations of the facial landmarks to another vector space, for example.

In a case in which operation 330 of performing the normalization, the face image obtained through the normalization may be used in subsequent operations 340 through 370. Thus, hereafter references to the "face image" may be understood to refer to the face image on which normalization has been performed when the normalization is performed and understood to refer to the face image without normalization when the normalization is not performed, depending on embodiment.

In operation 340, the facial verification apparatus determines whether an input face included in the face image is a partial face. In one example, the facial verification apparatus determines whether the input face is the partial face based on a result of detecting the face region, for example, a determined location of the detected face region. For example, in a case in which the detected face region is determined to include a portion of a boundary of the input image, or the detected face region is missing face portions or remaining portions of the detected face region for a whole face region are beyond the field of view (FoV) of the captured input image, the facial verification apparatus determines that the input face is the partial face. In a case in which the detected face region is determined to not include the boundary of the input image or the detected face region is included in the input image without missing portions beyond the FoV of the captured input image, the facial verification apparatus determines that the input face is a full face.

In one example, the facial verification apparatus determines a type of the partial face based on which boundar(ies) of the input image are determined to be included in the detected face region and/or which portion(s) of the example whole face region are determined missing from the detected face region or which select portion(s) of the example whole face region are determined to solely exist in the detected face region. For example, the facial verification apparatus may determine a type of the partial face to be a first type when the face portion missing from the input image is an upper side portion of a whole face region, e.g., a typical or predetermined example whole face region, and to be a second type distinguished from the first type when the face portion missing from the input image is a lower side portion of the example whole face region. A form of a synthesized face image to be described hereinafter may vary depending on which of plural partial face types are determined to be represented by the input image.

In another example, the determining of whether the input face is the partial face is based on a result of detecting facial landmarks. For example, when the facial verification apparatus detects for facial landmarks in the input image to detect the face region in operation 320, information about the detected facial landmarks and/or information about non-detected facial landmarks may be recorded or stored. In such an example, when one or more landmarks corresponding to at least one of plural predefined facial part regions are not detected, though sufficient aspects or landmarks for the face region do exist to detect the face region, the facial verification apparatus may determine that the input face included in the face image is the partial face. Similarly, if less than all landmarks corresponding to one or more such plural predefined facial part regions are detected, then the facial verification apparatus may determine that the input face included in the face image is the partial face. Conversely, when such landmarks associated with all or a minimum number or types of the plural predefined facial part regions are all detected in the face region included in the face image, the facial verification apparatus may determine that the input image is not the partial face, but a full face. Thus, an example, when the input face is determined to be the partial face, the facial verification apparatus may further determine which of plural types of partial faces are represented in the input image, e.g., based on the detected facial landmarks. For example, in a case in which landmarks corresponding to eyebrows and eyes are not detected in operation 320, though enough landmarks are detected to identify the presence of the face region in operation 320, the facial verification apparatus may determine in operation 340 that the type of partial face is the first type. Rather, in a case in which landmarks corresponding to a chin and lips are not detected in operation 320, though enough landmarks are detected to identify the presence of the face region in operation 320, the facial verification apparatus may determine in operation 340 that the type of the partial face is the second type.

In another example, although such partial face regions may be classified into the example first type or the example second type, the partial face region may be determined to represent plural partial face types or only one type with plural missing facial parts or regions, for example.

In operation 350, in response to a determination that the input face is the partial face in operation 340, the facial verification apparatus generates a synthesized face image by padding the partial face, such as combining aspects of the face image and aspects of a reference image or reference information. In one example, the facial verification apparatus generates the synthesized face image by combining image information of the face image and image information of the reference image based on the detected face region. The image information of the reference image used to generate the synthesized face image may at least correspond or relate to facial information that is not included or represented in the partial face. For example, the facial verification apparatus may fetch or extract, from the reference image or a storage or availability of corresponding image information, image information corresponding to a remaining face region, e.g., of the example full face, which may be determined as not being represented or detected, e.g., in operation 320, in the detected face region. In another example, the facial verification apparatus generates the synthesized face image by combining the image information of the face image and image information of a portion of the reference image corresponding to a face region corresponding to landmarks that are not detected in operation 320, for example. Thus, here, the synthesized face image may include the image information of each of the face image and the reference image, and thus image information of a partial face region included in the face image and one or more synthesized face regions not included in the input image, e.g., by being outside of the FoV of the camera that captured the input image. Said another way, image information from the reference image for partial face region(s) that are not represented in the input image may be filled or patched by the image information of the reference image, and facial verification may be performed on the synthesized face image including the image information from the face image and image information from the reference image, e.g., as a whole face image in the verification process. In an example, the respective image information for the face image and reference image may be respective pixel values of pixels included in each of the face image and the reference image.

In one example, a portion of the reference image to be used for the synthesizing is determined based on a determination of which face region is not included in the input face. The facial verification apparatus may, thus, determine a partial face type based on a result of the detecting for the facial landmarks, and determine what portion(s) of the reference image should be combined with image information for the input face for generating the synthesized face image based on the determined partial face type. For example, in response to a determination that the partial face type is the above example first type, the facial verification apparatus may generate the synthesized face image by combining the image information of the face image and image information of a first portion of the reference image corresponding to the first type. In response to a determination that the partial face type is the second type, the facial verification apparatus may generate the synthesized face image by combining the image information of the face image and image information of a second portion of the reference image corresponding to the second type. Still further, in response to a determination that the partial face type is the first type and the second type, the facial verification apparatus may generate the synthesized face image by combining the image information of the face image and image information of the example first and second portions of the reference image corresponding to the first and second types. The first portion and the second portion may differ from each other, for example. In addition, the portion of the reference image to be used for the synthesizing may be determined to exactly follow or match the facial boundaries of the determined missing facial portions of the input face, e.g., to exactly follow or match the boundary of the input face where the missing facial portions would have continued in a full face, or there may be permitted overlapping of the portion of the reference image and the face image to incorporate the determined missing portions. As another example, the face image may alternatively or additionally be partially trimmed or cropped so as to match predetermined facial boundaries of the determined missing portions, such as when predefined information for plural missing portions are stored in the memory for selective use depending on a determination of which portion of the face image is missing. Here, though such examples of the determining of the missing portions for generating the synthesized face image have been discussed, examples are not limited thereto.

The reference image refers to a predefined image to be used to generate a synthesized face image for the facial verification process, and the same reference image may also be used in a face registration process to also generate a synthesized face image for the face registration process. In one example, the reference image is determined based on a training images used to train a feature extractor that may be used in the registration process and/or the verification process. For example, the reference image may be a mean (or average) image or a mean (or average) value image of the training images. The average image may be generated by obtaining an average value of pixel values at corresponding locations among the respective training images. The average value image may be generated by obtaining an average value of pixel values of all pixels included in the respective training images, and allocating the average value to all the pixels. In the average image, a pixel value may vary based on a location of each pixel, and thus an averaged facial form or shape may be generated or represented in the reference image. In contrast, in the average value image, all the pixels may have the same pixel value, and thus a facial form or shape may not be generated or represented in the reference image. For example, the pixel value may ultimately be determined to have a color value similar to a skin color determined from averaging of all pixel values of one or more training data. However, examples of the reference image are not limited to the example described in the foregoing, and the reference image may be provided in various forms. For example, the reference image may be a single-color image irrespective of the training images. Also, there may be one or more different single-color images determined depending on different partial face regions, such as determined based on corresponding portions of training data, as only an example.

In operation 360, the facial verification apparatus determines whether a verification is successful or not based on the synthesized face image. Operation 360 will be described in greater detail with reference to FIG. 4.

Referring to FIG. 4, in operation 410, the facial verification apparatus may generate a difference image between the synthesized face image and the reference image. The difference image may include pixel value difference information, which is associated with a difference between pixel values at corresponding locations between the synthesized face image and the reference image. For example, the facial verification apparatus may generate the difference image by subtracting, from each pixel value of the synthesized face image, a pixel value at a corresponding location in the reference image.

In operation 420, the facial verification apparatus may extract a feature of the input face using the feature extractor. Here, image information of the difference image may be input to the feature extractor, and the feature extractor may output a feature vector corresponding to the image information of the difference image. In one example, the feature extractor is a neural network model including output layers that respectively correspond to each of the partial face types. In such an example, a feature vector output from one output layer, which may be one of several uppermost layers of the feature extractor, may be the extracted feature of the input face. In another example, a feature vector determined based on a value extracted from a hidden layer of the feature extractor, and further dependent on a value extracted from a single output layer or one of plural output layers, may be extracted as the feature of the input face. The feature extractor is trained through a training process, which will be described in greater detail further below with reference to FIGS. 6-7D and 14.

In operation 430, the facial verification apparatus determines whether the verification is successful based on a result of comparing the feature extracted by the feature extractor and a registered feature. The registered feature refers to a feature of a valid user that is registered in the face registration process. In the face registration process, a feature corresponding to the full face, and features respectively corresponding to predefined partial face types are registered. In one example, the facial verification apparatus compares the extracted feature and a registered feature, from among the plural registered features and corresponding to the determined type of the partial face, and determines whether the verification performed on the input face is successful based on a result of the comparing.

In one example, the facial verification apparatus determines a similarity between the extracted feature and the registered feature, and determines whether a user of the input face is a valid user or not based on the determined similarity. The greater a difference between the extracted feature and the registered feature, the lower the similarity. Conversely, the lower the difference, the greater the similarity. The facial verification apparatus determines the verification to be successful in response to the similarity being greater than a threshold value, and to be unsuccessful in response to the similarity being less than or equal to the threshold value.

Referring back to FIG. 3, in operation 370, in response to a determination that the input face is not the partial face in operation 340, the facial verification apparatus determines whether the verification is successful based on the face image. That the input face is not the partial face indicates that the input face is the full face. Operation 370 will be described in greater detail with reference to FIG. 5.

Referring to FIG. 5, in operation 510, the facial verification apparatus may generate a difference image between the face image and the reference image. The difference image may include pixel value difference information that is associated with a difference between pixel values at corresponding locations between the face image and the reference image.

In operation 520, the facial verification apparatus extracts a feature of the input face using the feature extractor. Here, image information of the difference image generated in operation 510 may be input to the feature extractor, and the feature extractor may output a feature vector corresponding to the image information of the difference image. Similar to operation 420 described with reference to FIG. 4, the feature of the input face may be extracted from the difference image.

In operation 530, the facial verification apparatus determines whether the verification is successful based on a result of comparing the extracted feature and a registered feature. The facial verification apparatus compares the extracted feature and a registered feature, from among plural registered features and corresponding to the full face, and determines whether the verification performed on the input face is successful based on a result of the comparing. Similar to operation 430 described with reference to FIG. 4, a similarity between the extracted feature and the registered feature is determined, and whether the verification is successful or not is determined based on the determined similarity.

Figure 6:
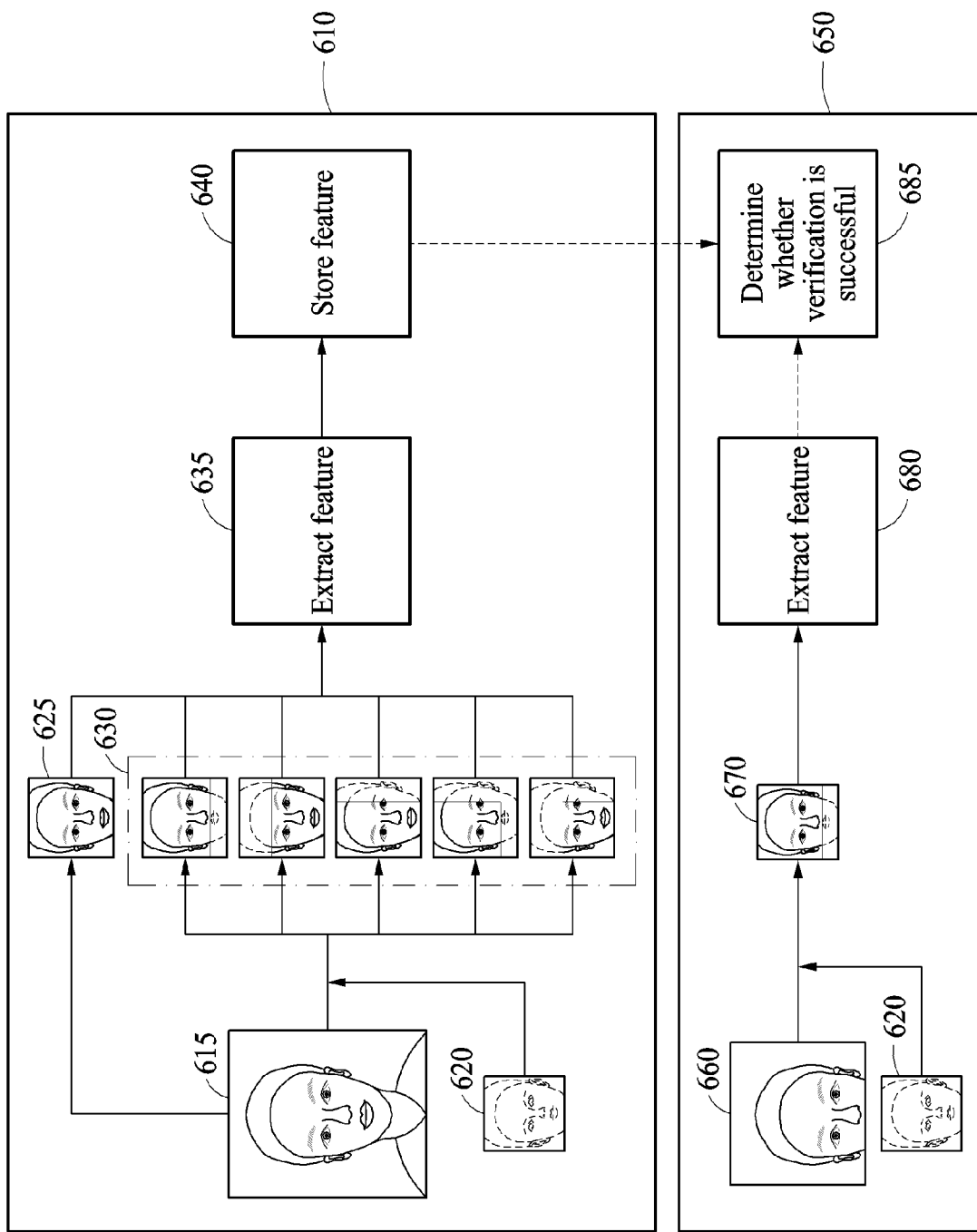
FIG. 6 is a diagram illustrating an example of a face registration process and a facial verification process.

FIG. 6 is a diagram illustrating an example of a face registration process and a facial verification process.

Referring to FIG. 6, in a face registration process 610, a feature is extracted from a registered image 615, and the extracted feature is stored as a registered feature. In one example, the registered image 615 is obtained by a user capturing an image of a face of the user using a camera to register the face of the user. In the face registration process 610, the registered image 615, which is obtained by capturing an image of a full face of the user, is used.

Operations 310 through 330 described above with reference to FIG. 3, regarding the normalization of an input image are also applicable to the registration process, and thus, the same or similar normalization may also be implemented and a normalized registered image 625 corresponding to the full face obtained from the registered image 615.

In addition, at least one synthesized face image 630 is generated based on the normalized registered image 625 and a reference image 620. According to examples, a single synthesized face image may be generated, or a plurality of synthesized face images respectively corresponding to multiple partial face types may be generated. The synthesized face image 630 refers to an image in which a portion of the normalized registered image 625, for example, is replaced by image information of the reference image 620 based for each partial face type. In one example, the reference image 620 is an average image or an average value image of training images used to train a feature extractor, as discussed above. In stage 635, features corresponding to the normalized registered image 625 and the synthesized face image 630, for example, each of the plurality of synthesized face images, are extracted. Here, as FIG. 6 may also be representative corresponding components and operations of such components of the example facial verification apparatus implementing the corresponding operations, and thus, stage 635 is also representative of one or more feature extractors. In stage 640, the extracted features are stored as registered features, e.g., in a memory of the facial verification apparatus also represented by the illustrated stage 640. Here, a feature corresponding to the normalized registered image 625 and a feature corresponding to the synthesized face image 630 are distinguishably stored.

In a facial verification process 650, a facial verification is performed based on a result of comparing a feature extracted from an input image 660 and a feature registered in the face registration process 610. In one example, in response to the input image 660, which is a target for the facial verification, being received, a facial verification apparatus detects a face region in the input image 660, and determines whether an input face included in the detected face region is a partial face. In the example of FIG. 6, a lip region is omitted from the face region in the input image 660, and thus the facial verification apparatus determines that the input face is the partial face. In such an example, the facial verification apparatus generates a synthesized face image 670 based on a face image corresponding to the detected face region and the reference image used in the face registration process 610. For further description of the method of generating the synthesized face image 670 from the input image 660, reference may be made to operations 310 through 350 described with reference to FIG. 3.

In stage 680, the facial verification apparatus extracts a feature of the input face from the synthesized face image 670 using a feature extractor, e.g., the same feature extractor used in the face registration process 610. Stage 680 is also representative of one or more feature extractors of the facial verification apparatus. Subsequently, in stage 685, the facial verification apparatus determines whether the facial verification is successful based on a result of comparing the extracted feature and a registered feature. In one example, the registered feature to be compared to the extracted feature is determined or selected based on a determined form of the input face appearing in the input image 660. For example, in a case in which the lip region is omitted as shown in the input image 660, a registered feature extracted based on a first synthesized face image of the synthesized face images in the face registration process 610, e.g., a synthesized face image in which the lip region is replaced by image information of the reference image 620, may be selectively acquired and compared to the feature extracted from the input image 660.

In another example, in a case in which a single synthesized face image is generated in the face registration process 610 and a registration feature extracted from the single synthesized face image is registered as a feature corresponding to a partial face, in the facial verification process 650 the input face appearing in the input image 660 is determined to be a partial face, a synthesized face image 670 is generated according to a same synthetic form, e.g., of a similar or same partial face type as the synthesized face images 630, a verification feature is extracted from the synthesized face image 670, and the verification feature is compared to the registration feature. For example, in a case in which the synthesized face image 630 in the face registration process 610 is generated by replacing a lower face region, for example, the lip region, by the image information of the reference image 620, the synthesized face image 670 to be generated in the facial verification process 650 also has the same synthetic form in which a lower face region is replaced by the image information of the reference image 620.

In addition, similar to above with respect to stages 635, 640, and 680 also being representative of components of the facial verification apparatus, stage 685 is also representative of the determiner component of the facial verification apparatus. For example, the determiner may include a series of sequential fully connected or dense nodal layers in a neural network example that may operate as trained to analyze the extracted verification feature(s) and stored registration feature(s) and output a valid or invalid indication the input verification image. The output verification indication may include an output of verification probability information and/or an indication of whether the similarity between one or more of the stored registration extracted features and one or more of the verification extracted features meets a predetermined verification threshold. The output verification may also include either or both of probabilistic values indicating the likelihood of the input verification image being successful and the likelihood of the input verification image being unsuccessful.

FIGS. 7A through 7D are diagrams illustrating examples of a method of extracting registered features in a face registration process.

Referring to FIG. 7A, to register a face appearing in a registered image 615 in a face registration process, registered features are extracted from the registered image 615 using a feature extractor 740. Here, a normalized image 705 corresponding to a full face is generated from the registered image 615, and a plurality of synthesized face images 710, 715, 720, 725, and 730 are generated based on the registered image 615, or the normalized image 705, and a reference image 620. Each of the synthesized face images 710, 715, 720, 725, and 730 corresponds to respective partial face types of plural partial face types. The respective partial face types may all be different partial face types, as only an example.

A difference image between the normalized image 705 and the reference image 620 may be input to the feature extractor 740, and the feature extractor 740 may accordingly output one or more first features corresponding to the normalized image 705. In addition, respective difference images between the reference image 620 and the synthesized face images 710, 715, 720, 725, and 730 may be each input to the feature extractor 740 individually or concurrently, and the feature extractor 740 may respectively output one or more features corresponding to each of the synthesized face images 710, 715, 720, 725, and 730. For example, in response to a difference image between the reference image 620 and the synthesized face image 710 being input to the feature extractor 740, the feature extractor 740 may outputs a second feature corresponding to a first partial face type of the synthesized face image 710. The first feature corresponds to the full face of the normalized image 705, and each of the second feature, a third feature, a fourth feature, a fifth feature, and a sixth feature corresponds to each first, second, third, fourth, and fifth partial face types of the plural partial face types and as respectively extracted with respect to the synthesized face images 710, 715, 720, 725, and 730.

For example, as demonstrated in the synthesized face images 720, 725, and 730, image information respective left regions of the face from the registered image 615, or from the normalized image 705, are each combined with image information of remaining face portions from the reference image 620. In one example, features may not be extracted from synthesized face images having a synthetic form that is symmetrical to a synthetic form of the synthesized face images 720, 725, and 730, or synthesized face images may only be generated for one of available symmetrical forms.

For example, in the synthesized face image 720, image information of a left region of the face from the registered image 615, or from the normalized image 705, is combined with the image information of a right region of the reference image 620, and a symmetrical synthesized face image could also be generated by combining image information corresponding to a right region of the face from the registered image 615, or from the normalized image 705, with image information of a left region of the reference image 620, and though features could be respectively extracted from both the synthesized face image 720 and such a symmetrical synthesized face image, in an example feature(s) may only be extracted from one of the synthesized face images. Also, for such symmetrical availabilities, only one of the available symmetrical synthesized face images may be generated and features extracted therefrom. Thus, although an input verification face, which is a target for facial verification, may be a partial face that does not include a corresponding right region of a face, it may be possible to merely symmetrical reverse, through image processing, the verification input face to become a partial face that does not include the left region of the face when the stored registered feature data corresponds to a synthesized face image with image information from the reference image for the left region of a registration image. For example, such a symmetrical reversal of a partial face may be selectively obtained by reversing the input image left and right about a bilateral centerline, such as of the verification face image or normalization of the verification face image. The selective obtaining of the reversal may be based on a determination of what partial face types were considered for the stored registration features that are available during the verification process, and only perform the selective obtaining of the reversal of the partial face during the verification process when stored feature values are only available with respect to the symmetrical registration partial face. Here, in an example, the reversing may be based on an assumption that a face is almost bilaterally symmetrical. Thus, a feature can be extracted from a partial face image of which the left and right regions are reversed, and the extracted feature may then be compared to a registered feature extracted from the synthesized face image 720, e.g., when the symmetrical synthesized face image corresponding to the synthesized face image 720 is not also generated and/or feature extracted from during the registration process, to enable a feature comparison based on a partial face of a same type. Additionally, though only one of such symmetrical pairs of synthesized faces may be generated and features extracted therefrom during the registration process, according to examples, such both synthesized face images having symmetrical synthetic forms, such as symmetric to the synthetic form of the synthesized face images 720, 725, and 730, may be further generated and one or more features may be extracted from each of the additionally generated synthesized face images in the face registration process and available for corresponding comparisons with extracted verification features during the facial verification process.

Figure 7B:
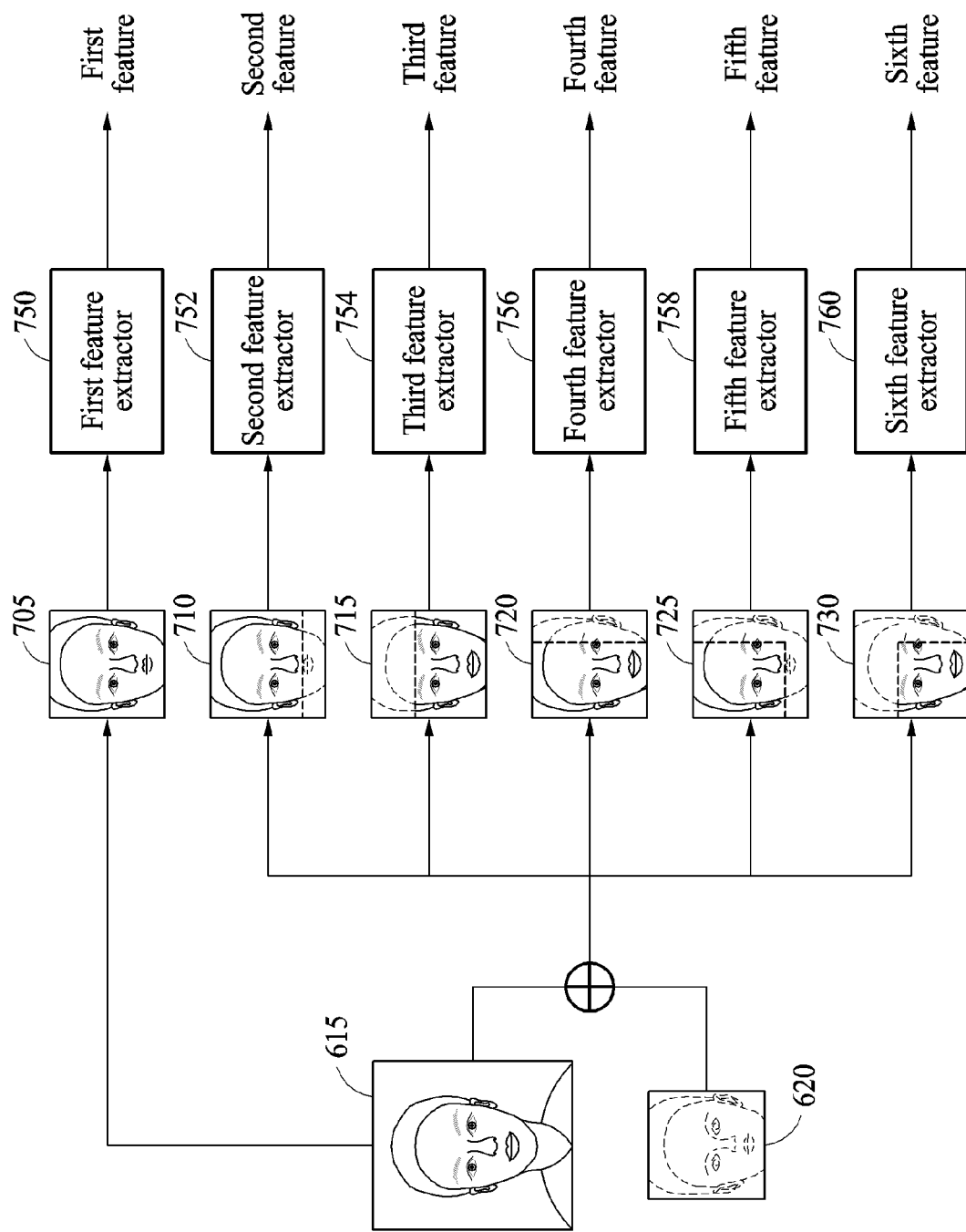

In another example, respective feature extractors are present for a full face and each partial face type as illustrated in FIG. 7B. Referring to FIG. 7B, a first feature extractor 750 is configured to extract a feature corresponding to a full face based on an image 705, and respective feature extractors 752, 754, 756, 758, and 760 are configured to respectively extract one or more features corresponding to each of the partial feature types corresponding to synthesized face images 710, 715, 720, 725, and 730.

Figure 7C:
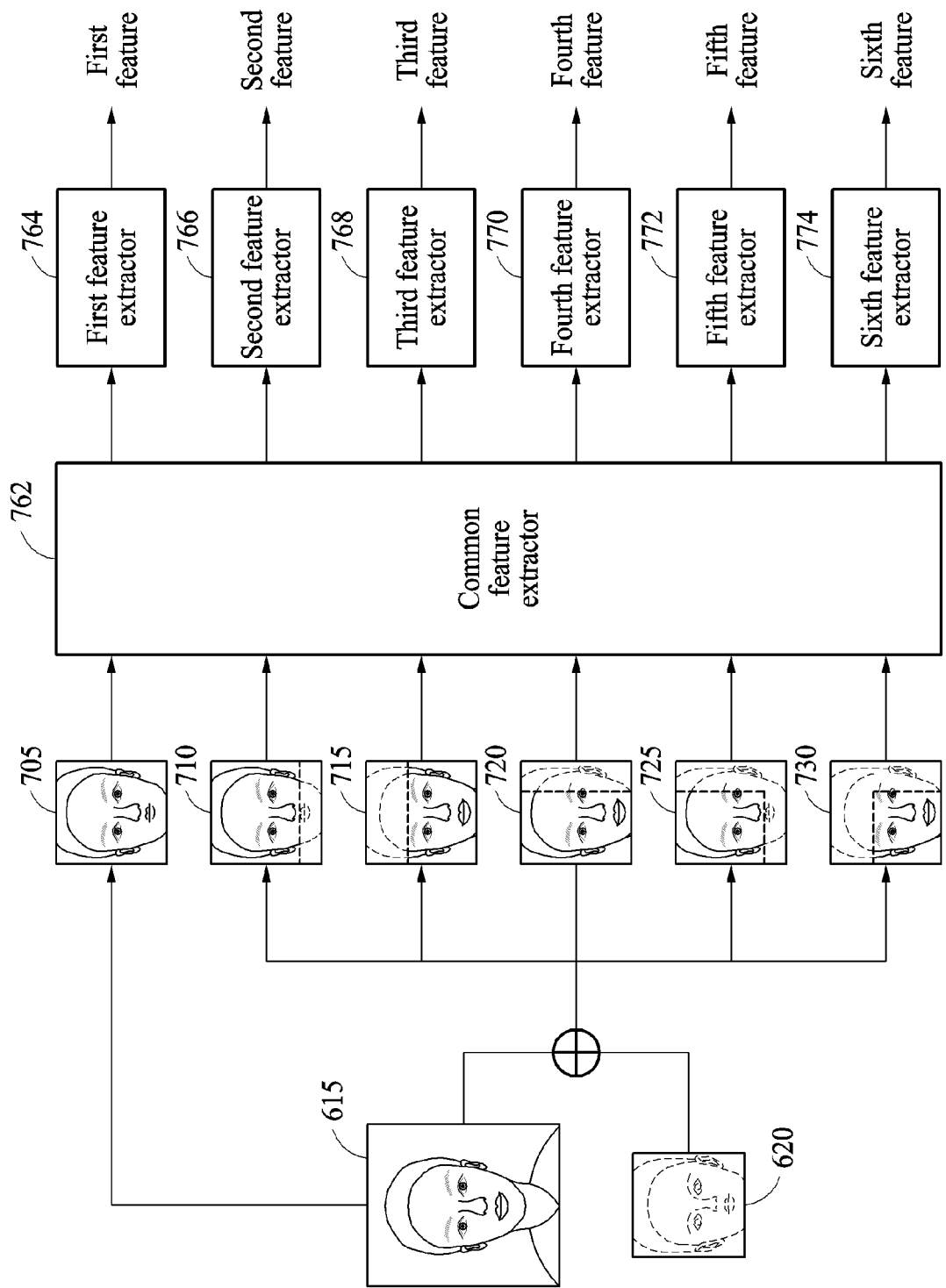

In still another example, a feature extractor includes a common feature extractor 762 and respective feature extractors 764, 766, 768, 770, 772, and 774 as illustrated in FIG. 7C. Referring to FIG. 7C, the common feature extractor 762 may be connected to the feature extractors 764, 766, 768, 770, 772, and 774. Thus, here, respectively intermediate feature(s) output from the common feature extractor 762 are transmitted to the feature extractors 764, 766, 768, 770, 772, and 774, and the feature extractors 764, 766, 768, 770, 772, and 774 output features corresponding to the full face and the partial face types, respectively. For example, a difference image between the normalized image 705 and a reference image 620 may be input to the common feature extractor 762, and the common feature extractor 762 may output an intermediate feature corresponding to the difference image and the output intermediate feature is transmitted to the first feature extractor 764, among the feature extractors 764, 766, 768, 770, 772, and 774. The first feature extractor 764 the outputs a first feature corresponding to the image 705 based on the intermediate feature transmitted from the common feature extractor 762.

Similarly, a difference image between the synthesized face image 710 and the reference image 620 may be input to the common feature extractor 762, and the common feature extractor 762 may output an intermediate feature corresponding to the corresponding difference image and the output intermediate feature is transmitted to the second feature extractor 766, among the feature extractors 764, 766, 768, 770, 772, and 774. The second feature extractor 766 outputs a second feature corresponding to the synthesized face image 710 based on the corresponding intermediate feature transmitted from the common feature extractor 762. In one example, the common feature extractor 762 and the feature extractors 764, 766, 768, 770, 772, and 774 may be configured in the facial verification apparatus as a single neural network, for example. As only an example, the common feature extractor 762 may include one or more convolutional layers, and/or one or more fully-connected or dense layers, configured to extract the respective intermediate features, and each of the feature extractors 764, 766, 768, 770, 772, and 774 may include one or more fully-connected or dense layers, as only non-limiting examples, configured to receive the intermediate features and output the example first through sixth features. As an alternative, each of the feature extractors may be configured in the facial verification apparatus as separate neural networks, or variously configured as two or more neural networks to generate the first through sixth features, in differing embodiments. With respect to FIGS. 6-7D, and as only example, while the respective difference images may be generated, such as between a synthesized face and a reference image, and the resultant difference image provided to an example extractor for feature extraction, an example exists where the difference image is alternatively generated by subtracting from an input partial face a determined matching partial face portion from a reference image, and providing that difference image to the extractor. As another example, with a neural network extractor implementation, the difference image may be generated or considered within the extractor by inputting information of the partial face image to the extractor and applying biasing within the extractor corresponding to remaining/missing partial face reference image information. Alternative approaches for generating implementing such extraction of features from such difference images may also be available.

Herein, a neural network includes a plurality of layers, and each of the layers includes a plurality of nodes, and is implemented by one or more processors of the facial verification apparatus. For example, there may be an input layer, at least one hidden layer, and an output layer. Depending on the architecture of the neural network, nodes included in neighboring layers may be selectively connected according to respective trained connection weights. For example, the neural network may be implemented by such a processor, i.e., the one or more processors of the facial verification apparatus, configured to generate a neural network structure/architecture with such a plurality of layers each including plural nodes and configured to apply such weighted connections between neighboring nodes in neighboring layers of the neural network structure to interpret input data applied to the neural network structure, such as represented by the various respective feature extractors of FIGS. 6-7D. As only examples, herein such an 'interpretation' of input data may include a performed feature extraction, recognition, verification, or rejection, such as for image, facial, or object recognition or verification, as well as any other trained objective(s) of the respective layers, collection of layers, and/or whole neural network. In an example, the image, facial, or object recognition may further include a recognition or matching of the image, face, or object among plural registered images, faces, or objects, such as in a clustering example, e.g., in generating one or more albums from such clusterings. Thus, based on the training data and desired interpretation objective(s), the architecture, selective connection between neighboring nodes, and corresponding connection weights may be varied during training until the neural network is trained to a desired acceptability for the desired interpretation objective(s). For example, in examples where the neural network is trained for the image verification or rejection, the neural network may include convolutional layers or be representative of a convolutional neural network (CNN), and thus the respective convolutional connection weights, e.g., for varying feature extractions through feature kernels, may be trained to an original desired acceptability for feature extraction and/or face verification or rejection operations, such as performed by the training apparatus 1400 of FIG. 14. The neural network may also be of a different type of neural network and merely include one or more convolutional layers, e.g., for selective feature extraction, for other objectives. Returning to the training of the neural network, the resultant connection weights of the trained neuro network may be referred to as parameters of the neural network, e.g., demonstrated as at least trained kernel values of a convolutional layer or operation of the example CNN. For example, the neural network may be trained based on the labeled input image information or desired corresponding output images, classifications, or geometric parameters, such as through a loss considering backpropagation or simulated annealing algorithms. For example, the neural network may be trained to extract features of training data. Thus, in the training, connection weightings between nodes of different hidden layers or for kernels of convolutional layers are recursively adjusted until the corresponding neural network model is trained with a desired accuracy rate or below a maximum error rate, for example. The trained neuro network may be stored in a memory of the training or recognition apparatus, for example, in any of the facial verification apparatuses discussed herein. In examples, the trained neural network may be stored in trained vectors, matrix or matrices, or other formats, e.g., where elements of the vectors, matrices, or other formats represent or suggest the corresponding trained parameters of trained weighted connections and/or kernels, as only examples, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected or dense, recurrent, convolutional, de-convolutional, or pooling layers, as only examples. The hyper-parameters may further include information of the configuration and values of any bias and/or contextual nodes in the neural network, corresponding activation functions of the nodes, types of nodes, such as long short-term memory nodes, and define any or any further recurrent structures of the neural network, which may vary depending on embodiment and interpretation objective of the trained neural network.

Figure 7D:
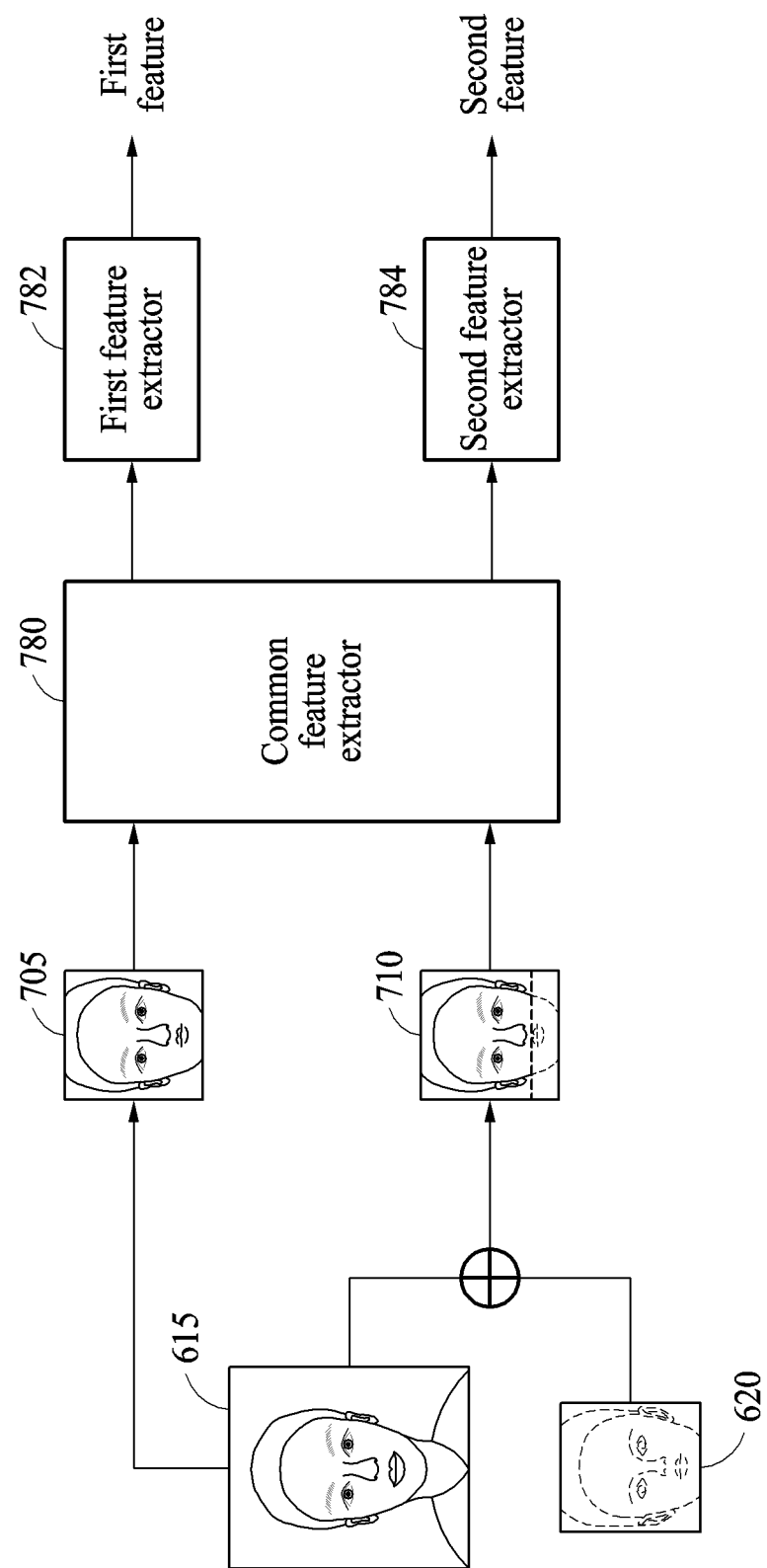

Accordingly, before or during operations of FIGS. 6-7D, as only examples, the facial verification apparatus may acquire such trained parameters, and input the face images and synthesized face images as discussed herein to any of the extractors, as described, that are specially configured using the acquired trained parameters to perform the corresponding described operations as described with respect to the various extractors of FIGS. 6-7D, as only examples.

In addition, one or more of the feature extractors implemented in, and represented by, operations 635 and 680 of FIG. 6 and feature extractors 740, 750, 752, 754, 756, 758, 760, 762, 764, 766, 768, 770, 772, 774, 780, 782, and 784 of FIGS. 7A-7D, as only non-limiting examples, may also be implemented only through a specially configured hardware module or implemented through hardware and instructions stored in/on non-transitory media, e.g., of or exterior to the facial verification apparatus, that, when executed by one or more processors of the hardware, for example, cause the processor to implement any, any combination, or all of the operations described herein. In addition, though trained neural network implemented feature extractors have been discussed here with respect to FIGS. 6-7D, embodiments are not limited thereto.

Still further, the number of partial face types is not limited to the examples illustrated in FIGS. 7A, 7B, and 7C, though in an example at least one partial face type may be provided according to examples to generate registration features based on a partial face. FIG. 7D illustrates such an example of a single partial face type.

Referring to FIG. 7D, in a face registration process, a feature is extracted to register a face appearing in a registered image 615. A normalized image 705 corresponding to a full face may be generated from the registered image 615, and a synthesized face image 710 may be generated based on the registered image 615, or the normalized image 705, and reference information, e.g., reference image 620. In the example illustrated in FIG. 7D, a lower region of the face is synthesized by combining a remaining non-lower portion of the registered image 615, or the normalized image 705, with image information of the example reference image 620 corresponding to the lower portion, to generate the synthesized face image 710. A difference image between the normalized image 705 and the reference image 620 may be input to a common feature extractor 780, and the common feature extractor 780 may output an intermediate feature corresponding to the normalized image 705. The output intermediate feature corresponding to the normalized image 705 may be further input to a first feature extractor 782, and the first feature extractor 782 may output a first feature corresponding to the full face based on the input intermediate feature corresponding to the normalized image 705. In addition, a difference image between the synthesized face image 710 and the reference image 620 may be input to the common feature extractor 780, and the common feature extractor 780 may output an intermediate feature corresponding to the synthesized face image 710. The output intermediate feature corresponding to the synthesized face image 710 may be input to a second feature extractor 784, and the second feature extractor 784 may output a second feature corresponding to a partial face based on the input intermediate feature corresponding to the synthesized face image 710. Similar to the example illustrated in FIG. 7C, the common feature extractor 780 and the feature extractors 782 and 784 may also be configured in the facial verification apparatus as a single trained neural network, or may be configured in the facial verification apparatus as separate trained neural networks.

As noted above, in an example, the respective example configurations and example feature extractors described with reference to FIGS. 7A through 7D may also be similarly included/implemented used in the facial verification process. Here, the structure of the feature extractor may be configured in the facial verification apparatus as at least one neural network for the face registration process and/or the facial verification processes of the facial verification apparatus. In addition, as discussed above and below with respect to FIG. 14, the facial verification apparatus may further be configured to train the respective feature extractors, as well generate or determine the reference information or reference image, based on training data. Alternatively, one or more facial verification apparatuses that perform the training of the respective feature extractors, as well as the available generation or determination of the example reference information or reference image, may be different from the facial verification apparatus that performs the registration of full and partial face features using such trained feature extractors and/or that performs verification for input verification image(s) also using the example trained feature extractors.

Accordingly, in an example of using the feature extractor 740 illustrated in FIG. 7A to extract a registered feature in a face registration process, a facial verification process may be performed based on the example feature extractor 740. Alternatively, in the example of FIG. 7B, the respective feature extractors 750, 752, 754, 756, 758, and 760 may be used in the face registration process, and the feature extractors 750, 752, 754, 756, 758, and 760 also used in the facial verification process. Here, during the facial verification process and though such further example feature extractors 752, 754, 756, 758, and 760 may also be available in the facial verification process, when an input face included in a face image is determined to include full face information, the facial verification apparatus may only input image information of the face image to the example first feature extractor 750, and the facial verification performed based on a feature extracted by the first feature extractor 750, e.g., with respect to a similar full face registration feature extracted during the registration process. Rather, when the facial verification apparatus determines that the input face included in the face image includes only partial face information, rather than the first feature extractor, the feature extractor to be used is selected by the facial verification apparatus from the second to sixth feature extractors 752, 754, 756, 758, and 760 based on a determined partial face type of the partial face information included in the face image, and the partial face information may be transmitted/provided to the selected feature extractor, e.g., along with reference information corresponding to the partial face information, and the facial verification performed based on a feature extracted by the selected feature extractor. In this example, the partial face information and the reference information corresponding to the partial face information that is provided to the selected feature extractor may be a combination of information corresponding to the aforementioned example image information of a corresponding synthesized face image discussed above with respect to FIGS. 4-6 and 7B, or may be difference information of a difference between such image information of the corresponding synthesized face image and a the reference image. As still another example, the selected feature extractor may be merely provided a difference between the partial face information and corresponding image information of the reference image for the same partial face areas. In still a further example, the reference image information may be separately provided, or made available, to the selected feature extractor and the feature extractor only provided the partial face information included in the face image and the feature extractor may be configured to consider the reference image information with respect to the partial face information to extract the feature corresponding to the partial face information.

Still further, in the example of the common feature extractor 780 and the first and the second feature extractors 782 and 784 of FIG. 7D used in the face registration process, the facial verification process may be performed based on the same common feature extractor 780 and first and second feature extractors 782 and 784. For example, in the facial verification process, the common feature extractor 780 may receive the face image as an input to output an intermediate feature to the first and the second feature extractors 782 and 784. The first feature extractor 782 may be used to extract a feature corresponding to a full face, and the second feature extractor 784 may be used to extract a feature corresponding to a partial face. In response to facial verification apparatus determining that the face image includes full face information of a user, the facial verification apparatus may control only the first feature extractor 782 to receive the intermediate feature from the common feature extractor 780, or only implements the first feature extractor 782, thereby extracting a feature to be used for the facial verification. In response to facial verification apparatus determining that the face image includes only partial face information of the user, the facial verification apparatus may control only the second feature extractor 784 to receive the intermediate feature from the common feature extractor 780, or only implements the second feature extractor 784, thereby extracting a feature to be used for the facial verification. As only a non-limiting example, the common feature extractor 780 may include one or more convolutional layers and/or fully-connected or dense layers, with each of the first and the second feature extractors 782 and 784 including, as only non-limiting examples, at least one or more further trained fully-connected or dense layers. The second feature extractor 784 configured to extract a feature corresponding to the partial face may correspond to any of the plurality of trained feature extractors 766, 768, 770, 772, and 774 as illustrated in FIG. 7C, such as being selectively configured, from the example available trained feature extractors 766, 768, 770, 772, and 774, to perform such selected corresponding feature extraction(s) based on the determined partial face type of the partial face. Here, in an example, the feature extractors 766, 768, 770, 772, and 774 may be respectively or collectively trained, such as discussed further bellow with respect to FIG. 14, such as to extract different features of partial face images of different partial face types to be used for the facial verification.

Figure 8A:
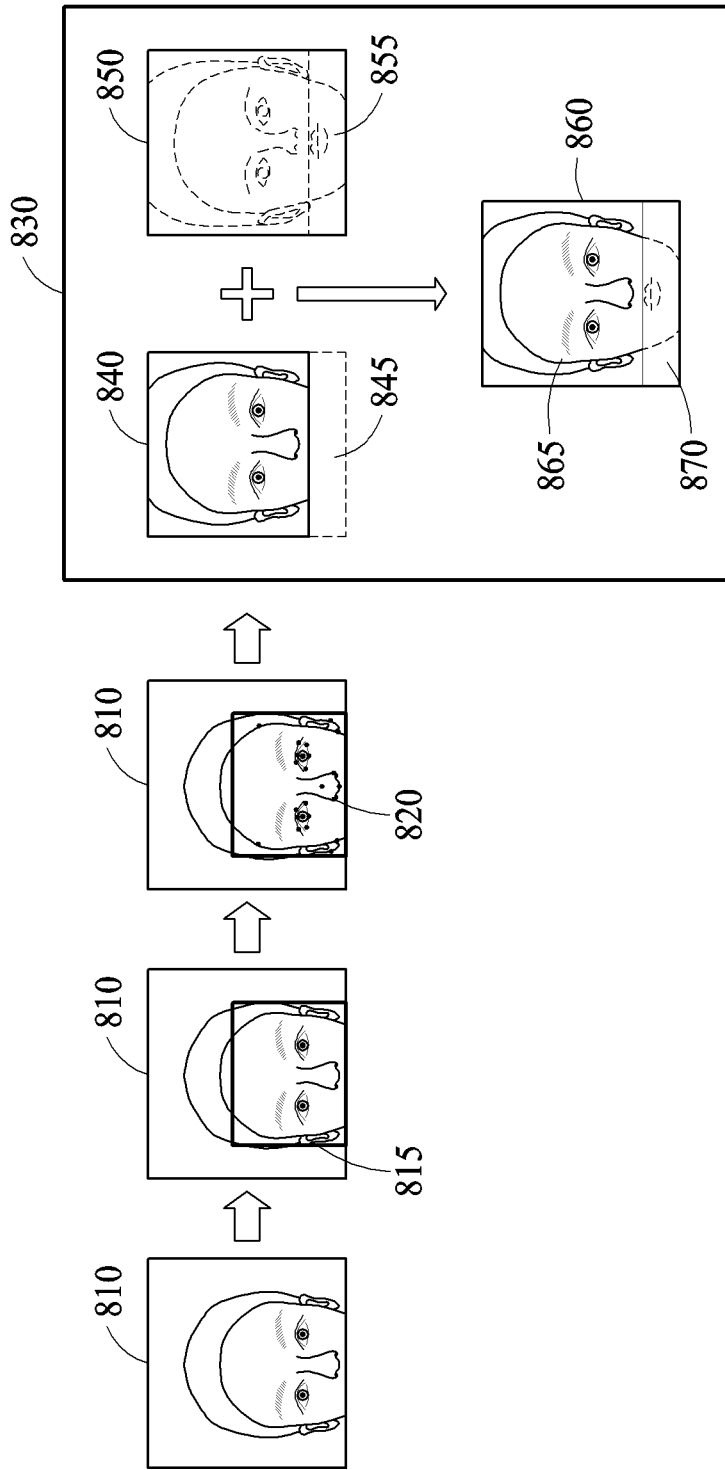
FIGS. 8A and 8B are diagrams illustrating examples of a method of generating a synthesized face image in a facial verification process.
Figure 8B:
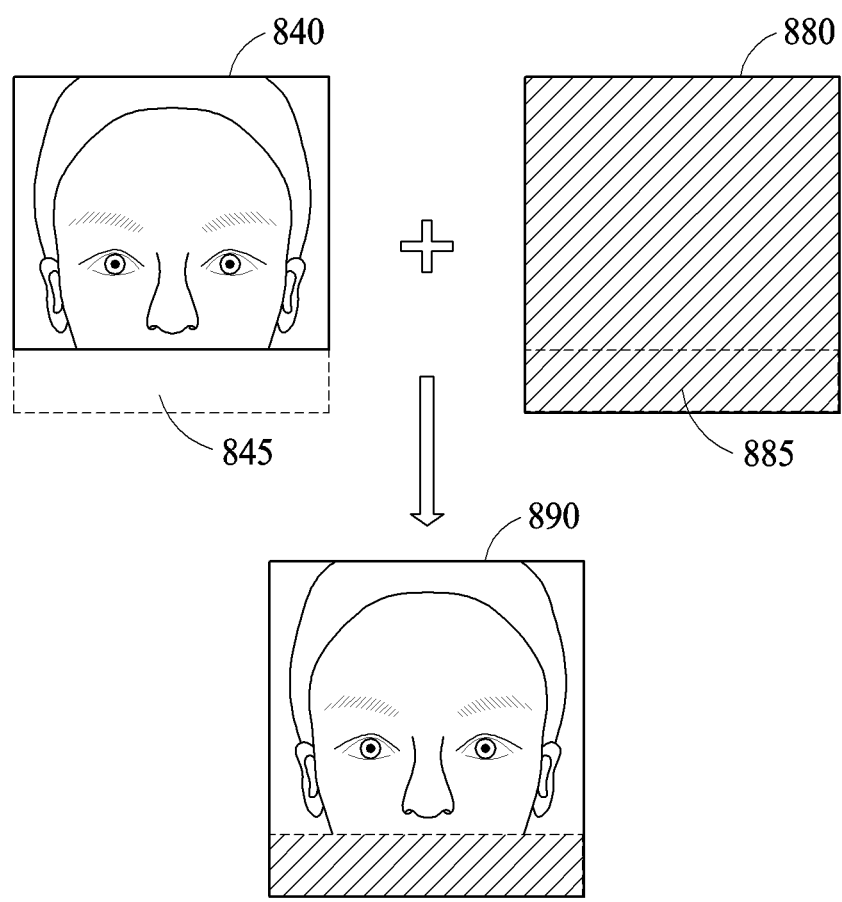

FIGS. 8A and 8B are diagrams illustrating examples of a method of generating a synthesized face image in a facial verification process. In addition, the above description regarding the generation of synthesized face images during the registration process is also applicable and available during the facial verification process, and thus the below discussion regarding the generation of synthesized face images in the facial verification process are only briefly presented for brevity purposes.

Accordingly, referring to FIG. 8A, in response to an input image 810 being input to a facial verification apparatus, the facial verification apparatus detects a face region 815 in the input image 810.

In one example, the facial verification apparatus determines whether an input face included in the input image 810 is a partial face based on whether the face region 815 includes a portion of a boundary of the input image 810 or whether the face region 815 is not a whole detected face region. In the example illustrated in FIG. 8A, the face region 815 includes a boundary of the input image 810 and a portion of location values available for use to define or identify the detected face region 815 are missing from the input image 810, and thus the facial verification apparatus determines that the input face is the partial face. In another example, the facial verification apparatus detects facial landmarks 820 in the face region 815, such as during the detection of the face region 815, and determines whether the input face is the partial face based on a result of the detecting of the facial landmarks 820. In the example illustrated in FIG. 8A, a landmark corresponding to a lip region of the face region 815 is not detected, and thus the facial verification apparatus determines that the input face is the partial face.

The facial verification apparatus may also normalize the input image 810 based on locations of the detected facial landmarks 820. Such a normalization process may include extracting the face region 815 from the input image 810, and matching the locations of the facial landmarks 820 to predefined reference locations, such as determined reference facial landmark locations corresponding to the reference image 850.

In response to a determination that an input face included in a face image 840 is a partial face, the facial verification apparatus performs a method 830 of padding the partial face, e.g., by generating a synthesized face image 860 using aspects of the partial face and aspects of the reference image 850 or other reference information. Herein, the padding of a partial face may correspond to a consideration, inclusion, or addition of additional information to more complete, or to fully complete, the partial face toward a full face based using the reference image, for example, or to merely include or add additional reference information or reference image information to the partial face where corresponding missing facial regions or aspects are not included in the partial face or out of the field of view (FoV) of an image, such as of a captured image during the registration and/or verification processes. In an example, such padding of full faces may be performed in training and/or registration, such as where a training image and/or registration image includes a full face, and/or performed in the training, registration, and/or verification processes where a training image, a registration image, and/or a verification image includes only a partial face. Additionally, here, references to such partial faces or full faces in the context of padding have similar meanings as the also discussed herein consideration of the input image as to whether the input image includes the full face or only a partial face, such as in operation 340 of FIG. 3. As discussed above, the reference image 850 may be an average image of training images used to train a feature extractor used in the facial verification process, as well as in the registration process. In one example, the facial verification apparatus determines a type of the partial face appearing in the face image 840 indicating the detected face region 815 based on a location of the detected face region 815 or a result of the detecting for the facial landmarks 820. Based on the determined type, a portion of the reference image 850 to be combined with the face image 840 may be determined. The facial verification apparatus generates the synthesized face image 860 by combining the image information of the face image 840 and image information of a portion 855 of the reference image 850 corresponding to a face region 845 that was not included in the face image 840. Here, though the missing portions 845 or select corresponding portion 855 of the reference image 850 have been demonstrated as rectangular or as otherwise having respective straight boundaries with which the synthesizing is performed, the missing portion 845 and/or the portion 855 of the reference image may also have irregular shapes and thus may not need to have such rectangular or a straight line boundaries. For example, a form of either boundary may be a curved line, a polygon, or other irregular shape. The resulting synthesized face image 860 thus includes a region 865 corresponding to the image information of the face image 840 and a region 870 corresponding to the image information of the reference image 850.

In an example, when the synthesized face image 860 is generated, a difference image between the synthesized face image 860 and the reference image 850 may be input to the feature extractor for feature extraction. Rather, if one or more features were extracted merely from a difference image between the reference image 850 and the face image 840 including only the partial face, a portion of the difference image that corresponds to the missing face region 845 may act as noise by/through the image information of the reference image 850, and thus an accuracy of a facial verification may decrease due to such a noise. However, as described above, when feature(s) are extracted from the difference image between the synthesized face image 860 and the reference image 850, image information of the portion of the difference image corresponding to the face region 845 may be offset in a process of differentiating between the synthesized face image 860 and the reference image 850, and thus noise may not be introduced to the extraction process. Thus, in such a further example, the facial verification apparatus may maintain a further high accuracy of the facial verification, despite an input of a partial face, by extracting feature(s) from the example difference image between the synthesized face image 860 and the reference image 850.

In one example, the reference image 850 may be an average image of training images as illustrated in FIG. 8A, or alternatively an average value image of the training images or an image of which all pixels have a same pixel value as illustrated in FIG. 8B. Still further, rather than a reference image, a single reference value may be used. FIG. 8B illustrates an example of a method of generating a synthesized face image 890 based on a reference image 880, as the example average value image. In such an example, the reference image 880 may be an image generated by allocating, to all pixels, an average value of pixel values of all pixels of the training images used to train the feature extractor, such as discussed further below with respect to FIG. 14. The facial verification apparatus generates the synthesized face image 890 by combining image information of a face image 840 and image information of a portion 885 of the reference image 880 corresponding to a face region 845 that is missing in the face image 840.

Figure 9:
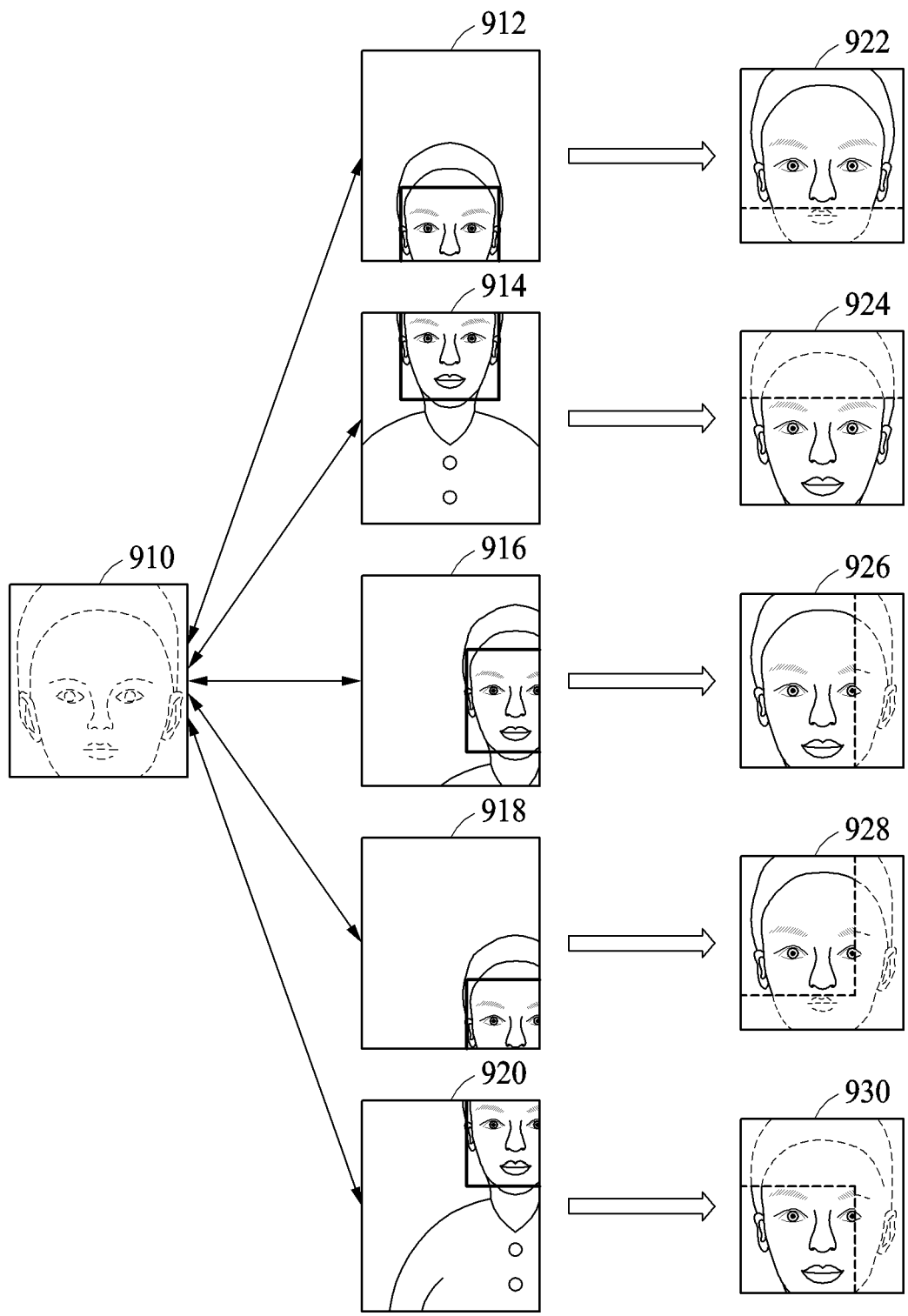
FIG. 9 is a diagram illustrating examples of a synthesized face image based on a partial face type.

FIG. 9 is a diagram illustrating examples of a synthesized face image based on a partial face type.

Referring to FIG. 9, different synthesized face images are generated based on which different type of a partial face is determined to be included in an input image during the verification process. As shown in the example different input images 912, 914, 916, 918, and 920, various partial face types are demonstrated. For example, a lip region is not detected in the input face of input image 912, or an above eyebrows face region is not detected in the input face of input image 914. A facial verification apparatus distinguishes between such partial face types, and selectively generates one or more of the synthesized face images 922, 924, 926, 928, and 930 by combining corresponding image information of a reference image 910 and image information the input images 912, 914, 916, 918, and 920, respectively, based on corresponding determined partial face type(s). Further the appropriate portion of the reference image 910 to be combined into each of the synthesized face images 922, 924, 926, 928, and 930 is determined based on each partial face type and/or respectively determined missing face portions or regions. An input image may be missing more than one determinable face region or portion, e.g., as determined from plural diverse, distinct, or distant landmarks that are not detected in the input image, in which case a synthesized image may be generated with the respective appropriate plural portions of the reference image 910. The resulting extracted feature may then be compared to a registration feature extracted from registration synthesized image that included such or similar plural portions of the reference image 910.

Thus, in the facial verification processes, a synthetic form of the synthesized face images corresponding to such partial face information are not limited to the examples illustrated in FIG. 9 or discussed herein, and a single synthetic form or a plurality of synthetic forms may be applied to generate a synthesized face image. Also, using as only an example a case in which a synthetic form of a synthesized face image is generated by adding a lower face region from image information of a reference image, as shown in the synthesized face image 922, the facial verification apparatus may generate a synthesized face image by combining image information of a lower region of an input face included in an input image with the image information of the reference image irrespective of a determined partial face type, or irrespective of whether determination of the partial face type is performed, when the input face included in the input image is determined to be a partial face. Similarly, any or any combination of the other discussed synthesized face images corresponding to different partial face types may also be performed irrespective of a determined partial face type or irrespective of whether determination of the partial face type is performed.

Figure 10:
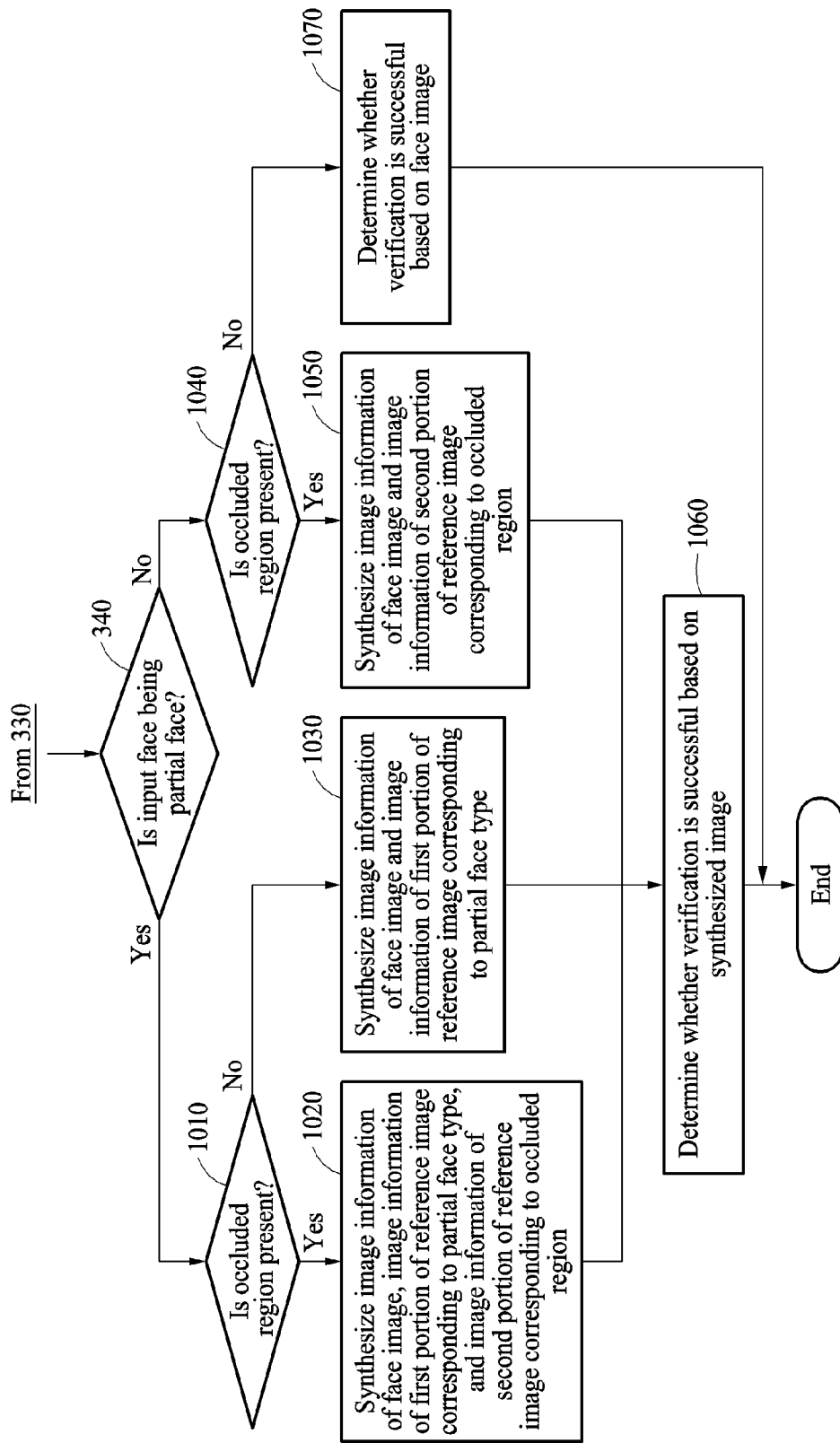
FIG. 10 is a flowchart illustrating an example of a facial verification method.

FIG. 10 is a flowchart illustrating an example of a facial verification method.

It should also be noted that in some alternative implementations, the functions/acts noted may occur out of the order noted in the figures. For example, two successive operations to be described with reference to FIG. 10 may be performed substantially concurrently, or the operations may be performed in the reverse order or other order depending on the functions or acts involved.

In one example, in a facial verification process, a facial verification apparatus further uses or considers an occluded region, or determined occluded region, included in an input image. The occluded region refers to a region of an input face included in the input image that is occluded by, for example, glasses, sunglasses, a mask, and a hair band. Such an occluded region may hinder an extraction of a unique feature of a user from the input face included in the input image, and also degrade an accuracy of a facial verification. The facial verification apparatus determines whether an occluded region is present in an input image. In response to the occluded region being present and in addition to the partial face considerations, the facial verification apparatus replaces image information of the occluded region by image information of a reference image to perform the facial verification.

Thus, referring to FIG. 10, the illustrated operation 340 may correspond to operation 340 of FIG. 3, and thus, descriptions of operations 310 through 340 provided with reference to FIG. 3 above are also applied and implemented here. Thus, in operation 340, the facial verification apparatus determines whether an input face included in a face image is a partial face. In operation 1010, in response to a determination that the input face is the partial face, the facial verification apparatus determines whether an occluded region is present in the input face included in the face image.

In operation 1020, in response to a determination that the occluded region is present, the facial verification apparatus generates a synthesized face image by combining image information of the face image, image information of a first portion of the reference image corresponding to a determined partial face type, and image information of a second portion of the reference image corresponding to the occluded region. In one example, the facial verification apparatus generates the synthesized face image by combining the face image with the image information of the first portion of the reference image, and replacing the image information of the occluded region detected in the face image by the image information of the second portion of the reference image. According to examples, the first portion and the second portion may overlap each other or may be separate.

In operation 1030, in response to a determination that the occluded region is not present, the facial verification apparatus generates a synthesized face image by combining the image information of the face image and the image information of the first portion of the reference image corresponding to the determined partial face type. Such an operation is the same as operation 350 described with reference to FIG. 3, for example, and as an operation of generating a synthesized face image as described in the examples illustrated in FIGS. 6-9, also as examples, noting that embodiments are not limited thereto.

In operation 1040, in response to a determination that the input face is not a partial face in operation 340, the facial verification apparatus determines whether the occluded region is present in the input face included in the face image. In operation 1050, in response to a determination that the occluded region is present, the facial verification apparatus generates a synthesized face image by combining the image information of the face image and the image information of the second portion of the reference image corresponding to the occluded region. The facial verification apparatus generates a synthesized face image by replacing the image information of the occluded region in the face image by the image information of the second portion of the reference image.

In operation 1060, when the synthesized face image is generated in operation 1020, 1030, or 1050, the facial verification apparatus determines whether a verification is successful based on the synthesized face image. Operation 1060 is the same as operation 360 described with reference to FIG. 3 above, for example, also noting that embodiments are not limited thereto.

In operation 1070, in response to a determination that the occluded region is not present, also after the determination that the input face is not a partial face in operation 340, the facial verification apparatus determines whether the verification is successful based on the face image, e.g., without generating any synthesized face images. In such a case, a full face is included in the input image without the occluded region, and thus operation 1070 is the same as operation 370 described with reference to FIG. 3 above, noting that embodiments are not limited thereto.

As described above, it is possible to prevent a degradation of a recognition rate based on a further presence or absence of an occluded region by performing the facial verification method. Corresponding to the example illustrated in FIG. 10, the face registration process that extracts the registered feature values considered in operation 1060, for example, also includes detecting an occluded region in a registered image, generating a synthesized registration face image by replacing the occluded region by image information of a reference image in response to the occluded region being present, and extracting such a registered feature from the generated synthesized registration face image. According to examples, though an occluded region may not be present in a registered image, this face registration process may still generate a plurality of synthesized face images corresponding to varying types of occluded regions, and thus, registered features may be extracted from the generated synthesized face images for face verification for input verification images that do or do not include, e.g., regardless of their inclusion, similar occluding elements/objects or regions.

Figure 11:
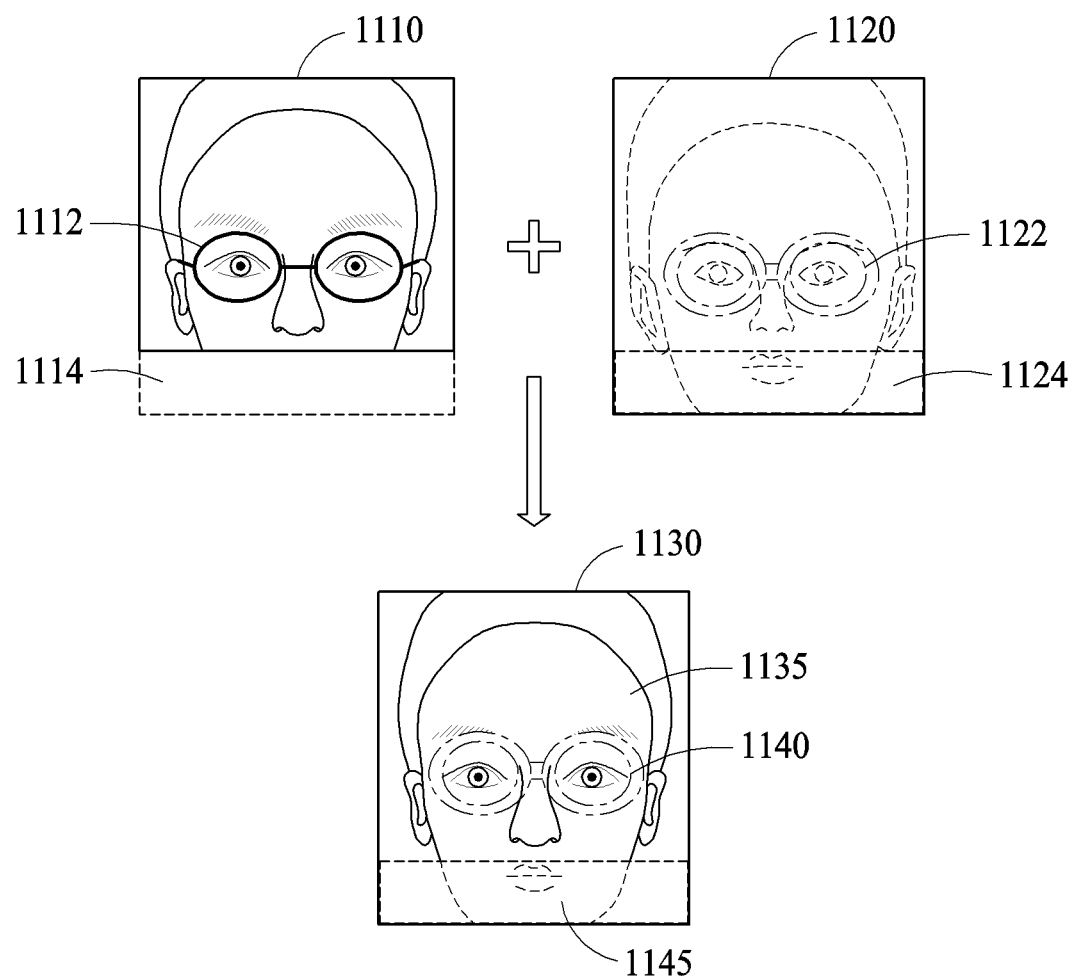
FIG. 11 is a diagram illustrating an example of a method of generating a synthesized face image in response to an occluded region being present in an input image with a partial face.

FIG. 11 is a diagram further illustrating an example of a method of generating a synthesized face image in response to an occluded region being present in an input image with a partial face.

Referring to FIG. 11, in a case in which an input face included in a face image 1110 is a partial face, for example, a facial verification apparatus applies, to the face image 1110, image information 1145 of a first portion 1124 of a reference image 1120 corresponding to a face region 1114 that was not originally included in the face image 1110. As illustrated, the face image 1110 also includes an occluded region, e.g., occluded by glasses 1112. In a case in which the facial verification apparatus detects the example glasses 1112 in the face image 1110, the facial verification apparatus applies image information 1140 of a second portion 1122 of the reference image 1120 corresponding to the occluded region including the example glasses 1112. A synthesized face image 1130 generated through the foregoing includes the image information 1135 of the face image 1110, the image information 1145 of the first portion 1124 of the reference image 1120, and the image information 1140 of the second portion 1122 of the reference image 1120. Here, though occluding objects/elements such as glasses are discussed, embodiments are not limited thereto.

FIG. 12 is a diagram illustrating an example of a facial verification apparatus. The facial verification apparatus 1200 may be configured to perform any one or combination or all operations described above, noting that embodiments are also not limited thereto.

Referring to FIG. 12, the facial verification apparatus 1200 receives an input image for a facial verification. The facial verification apparatus 1200 determines whether the facial verification is successful based on a result of comparing a feature extracted from the input image and a registered feature stored in a database (DB) 1230, e.g., based a resulting determined similarity value and whether that similarity value meets a minimum verification threshold. A valid user may register a face of the valid user, in advance, e.g., stored as a feature or an image of a face of the user, in any of the face registration processes discussed herein. Such registered information may be stored in the DB 1230.

The facial verification apparatus 1200 performs one or more, any combination, or all processes, stages, or face verifying and/or registration operations described herein with respect to FIGS. 1-11 and 13, and may provide a user with a result of a facial verification. The facial verification apparatus 1200 may output the result of the facial verification in a form of, for example, a voice, a vibration, a letter, an image, or a video. However, a scope of examples is not limited to the examples described in the foregoing, and the facial verification apparatus 1200 may output the result of the facial verification in various forms. In addition, the facial verification apparatus 1200 may also correspond to the training apparatus 1400 of FIG. 14, and thus also be configured to implement the training of one or more or all example feature extractor models or neural networks described herein, as well as training of such models, neural networks, or other models or neural networks to further provide the result of the face verification of a user as discussed herein or to control further operations of the facial verification apparatus 1200.

The facial verification apparatus 1200 includes at least one processor 1210 and a memory 1220. The memory 1220 is a non-transitory computer readable media or device connected to the processor 1210, and stores instructions, which when executed by the processor 1210, cause the processor 1210 to implement one or more or all operations described herein. The memory may further store data to be processed by the processor 1210 or data having been processed by the processor 1210. The memory 1220 may further store trained parameters of one or more models or neural networks that, when applied, configure the processor 1210 as described herein. The memory 1220 includes, for example, a high-speed random access memory (RAM) and/ or a nonvolatile computer-readable storage medium (e.g., at least one disk storage device, a flash memory device, or other nonvolatile solid state memory devices).

The processor 1210 may be configured to perform one or more or all processes, stages, or operations described with reference to FIGS. 1 through 11 and 13-14. For example, the processor 1210 may be configured to detects a face region in an input image, and determine between an input face included in the detected face region being a full face and a partial face. For example, in response to the detected face region being determined to include a portion of a boundary of the input image or the input image being determined to not include a whole detected face region, the processor 1210 determines that the input face is the partial face. In response to the detected face region being determined to not include such a boundary of the input image or the whole detected face region being determined to be included in the input image, e.g., without missing face portions or regions in the input image, the processor 1210 may determine that the input face is the full face. For another example, in response to landmarks corresponding to at least one of predefined facial part regions being determined to not be detected in a detecting of facial landmarks in the input image, the processor 1210 may determine that the input face is the partial face. Conversely, in response to one or more landmarks corresponding to each of all of the predefined facial part regions being detected, the processor 1210 may determine that the input face is the full face.

In response to a determination that the input face is the partial face, the processor 1210 may generate a synthesized face image by combining image information of the input face image and image information of a reference image. In one example, the processor 1210 generates the synthesized face image by combining image information of the input face image and image information of portion(s) of the reference image corresponding to those facial landmarks that are not detected in the input face image. The processor 1210 may further determine a partial face type of the input face and selectively generate a single or less than all partial face type synthesized images depending on the determined partial face type, and/or only implement a single synthesized image with a select feature extractor based on the determined partial face type. In another example, the processor 1210 determines whether an occluded region is present in the input face included in the face image. In response to a determination that the occluded region is present, the processor 1210 generates the synthesized face image by combining the image information of the face image and image information of a portion of the reference image corresponding to the occluded region. The processor 1210 extracts a feature of the input face from the synthesized face image using a feature extractor, compares the extracted feature and a registered feature, and determines whether a verification is successful based on a result of the comparing. In response to a determination that the input face is not the partial face, for example, a determination that the input face is the full face, the processor 1210 extracts the feature of the input face from the face image using the feature extractor, compares the extracted feature and a registered feature, e.g., of the registered image, and determines whether the verification is successful based on a result of the comparing.

FIG. 13 is a diagram illustrating an example of a computing apparatus.

Referring to FIG. 13, a computing apparatus 1300 performs a facial verification process by obtaining an image including a face of a user and comparing a feature extracted from the obtained image and a registered feature. The computing apparatus 1300 may correspond to the computing apparatus 120 illustrated in FIG. 1, the facial verification apparatus 1200 illustrated in FIG. 12, as well as the training apparatus 1400 of FIG. 14, as non-limiting examples.

The computing apparatus 1300 includes a processor 1310, a memory 1320, a camera 1330, a storage device 1340, an input device 1350, an output device 1360, and a network interface 1370. The processor 1310, the memory 1320, the camera 1330, the storage device 1340, the input device 1350, the output device 1360, and the network interface 1370 may communicate with one another through a communication bus 1380.

The camera 1330 captures a still image, a video image, or both. The processor 1310 may control the camera 1330 to obtain or capture an image, e.g., including a face region, of a user by capturing an image for the face region of the user attempting at the facial verification, or may control the camera 1330 to autonomously capture images and automatically verify a user, for example, without user initiation. In addition, as noted above, the camera 1330 may also be controlled by the processor 1310 during other functions of the computing apparatus 1300, such as when operated as a personal camera.

The processor 1310 may implement functions and instructions to operate in the computing apparatus 1300 as described herein. For example, the processor 1310 may execute instructions stored in the memory 1320 or the storage device 1340. The processor 1310 is configured to perform one or more, any combination, or all operations described with reference to FIGS. 1 through 12 and 14. For example, the processor 1310 may be configured to perform registration and the facial verification by comparing the face image captured by the camera 1330 and the registered face image or corresponding registered features. The processor 1310 may further perform the facial verification even when the obtained face image does not include full face information of the user. In response to the obtained face image including only partial face information of the user, for example, the processor 1310 may generate a synthesized face image from information of the face image and information of a predefined reference image, e.g., based on a determined type of the partial face information, and may perform the facial verification based on the generated synthesized face image. In addition, the processor 1310 is configured to control other functions of the computing apparatus 1300. For example, the computing apparatus 1300 may be mobile device, such as a mobile phone, tablet, or personal computer, and thus the processor 1310 is further configured to implement other typical functions of the computing apparatus 1300. In an example, the processor 1310 may be configured to implement a lock-out operation to only permit a user to access or implement such other typical functions upon a successful verification of the user's captured face image, as discussed above.

The memory 1320 is a non-transitory computer readable media or device that stores information to be used for the facial verification. The memory 1320 includes a computer-readable storage medium or a computer-readable storage device. In addition, memory 1320 is further representative of multiple such types of memory. The memory 1320 includes, for example, a RAM, a dynamic RAM (DRAM), a static RAM (SRAM), and other types of a nonvolatile memory well-known to the technical field to which the present disclosure pertains. The memory 1320 stores instructions to be implemented or executed by the processor 1310, and stores related information during software or an application being performed by the computing apparatus 1300.

The storage device 1340 includes a computer-readable storage medium or a computer-readable storage device. The storage device 1340 stores a DB including registered features or registered images. In one example, the storage device 1340 stores a greater quantity of information compared to the memory 1320, and stores information for a long period of time. The storage device 1340 includes, for example, a magnetic disk drive, an optical disc, a flash memory, an erasable programmable read-only memory (EPROM), a floppy disk, or other types of nonvolatile memories well-known in the technical field to which the present disclosure pertains.

The input device 1350 receives an input from the user through a tactile, video, audio, or touch input. The input device 1350 includes, for example, a keyboard, a mouse, a touchscreen, a microphone, and other devices configured to detect the input from the user and transmit the detected input to the computing apparatus 1300.

The output device 1360 provides the user with an output of the computing apparatus 1300 through a visual, auditory, or tactile channel. For example, the output device 1360 visualizes information related to the facial verification and provides the user with the visualized information. For example, the visualized information may indicate whether the facial recognition was successful, or may enable access to further functions of the computing apparatus 1300 demonstrated through the visualized information. The output device 1360 includes, for example, a liquid crystal display (LCD), a light-emitting diode (LED) display, a touchscreen, a speaker, a vibration generator, and other devices configured to provide the output to the user. In one example, during the facial registration or verification respectively being performed, the computing apparatus 1300 displays or visually feeds backs the currently captured face image, or a preview image, obtained by the camera 1330 on a display screen to be viewed by the user, or another guide, or does not display the example face image, preview image, or other guide. The example face image or preview image may provide such visual feedback or encouragement to guide the user to provide the computing apparatus 1300 a full face image. The visual feedback may be a display of the currently captured image frames from which the input image is to be selectively captured for the facial recognition, or may provide the user with illustrated guidelines or overlays for a desirable or preferred positioning and size of the to-be captured image for facial recognition. As noted, such face image or preview image may also not be provided, such as in the example where such facial verification is automatically performed, e.g., without user initiation.

The network interface 1370 communicates with an external device through a wired or wireless network. The network interface 1370 includes, for example, an Ethernet card, optical transceiver, a radio frequency transceiver, and other network interface cards configured to transmit and receive information. The network interface 1370 wirelessly communicates with the external device using a communication method, such as, for example, Bluetooth, WiFi, or a third generation (3G), fourth generation (4G), or fifth generation (5G) communication method. The network interface 1370 may further include a near field transceiver or the like. For example, through control of the processor 1310 upon verification of a user, the near field transceiver may transmit a payment authorization to an external terminal, such as with an appropriate mobile payment instruction transmitted by the near field transceiver. In addition, the processor 1310 may control the network interface 1370 to routinely check for updates for the registration and/or verification extractors and neural network(s), for example, and request, receive, and store parameters or coefficients of the same in the memory 1320. For example, when the feature extractors and face verifying is implemented though the above example neural network feature extractors and/or face verifying networks, the processor 1310 may request, receive, and store updated weighting matrices for any or all of the extractors or the face verifying network. In addition, updated hyper-parameters that can control or alter the configuration or architecture of such neural networks may also be requested, received, and stored along with corresponding weighting matrices in any of the memory 1320 or storage device 1340.

FIG. 14 is a diagram illustrating an example of a training apparatus.

Referring to FIG. 14, a training apparatus 1400 refers to an apparatus configured to train a feature extractor 1430 used for a facial verification, such as discussed above with respect to FIGS. 6-7D, as non-limiting examples. For example, the feature extractor 1430 may be a neural network model configured to output a result value corresponding to an input value, and trained based on plural training images and a reference image. Here, the reference image may be identical to the reference image used in the above-described face registration processes and facial verification processes, though embodiments are not limited thereto.

The training apparatus 1400 includes at least one processor 1410 and a memory 1420. The memory 1420 is a non-transitory computer readable medium or device connected to the processor 1410, and stores instructions implementable by the processor 1410 to implement such training of the neural networks, data to be processed by the processor 1410, and/or data processed by the processor 1410 during the training of the neural networks. The memory 1420 further stores the resultant trained parameters of the neural network(s) after the training.

When one or more training images are input to the training apparatus 1400, the processor 1410 detects respective face regions in the training image(s), and determines whether a face included in the respective detected face regions is a full face or a partial face. In response to a determination that the face is the partial face, the processor 1410 generates one or more synthesized face images by combining image information of the training image and image information of the reference image based on one or more predetermined types of partial faces, respectively, for example. The processor 1410 extracts one or more features from the example synthesized face image using the feature extractor 1430, e.g., similarly to the face registering and facial verification processes of FIGS. 3-13, and thus, for further detailed description, reference may be made to such above descriptions of the registration and facial verification processes provided herein. In one example, the processor 1410 calculates a loss that may be caused by a difference between a feature extracted by the feature extractor 1430 and an intended feature, and trains the feature extractor 1430 by adjusting parameters included in the feature extractor 1430 to reduce the calculated loss, as discussed above with the description of FIGS. 6-7D.

The training apparatus 1400 repetitively performs the process described in the foregoing on each of numerous training images in order to adjust the parameters of the feature extractor 1430 to be gradually desirable, such as through connection weightings between nodes of different hidden layers being recursively adjusted until the corresponding neural network of the feature extractor 1430 is trained with a desired accuracy rate or below a maximum error rate, for example, such as discussed above with the description of FIGS. 6-7D. Thus, all above descriptions about registration and facial verification processes are also applicable to the training apparatus 1400. Further, the processor 1410 may be configured to perform respective trainings to train the feature extractor 1430 in accordance with any of the above feature extractor examples, including the illustrated examples of FIGS. 6-7D, the descriptions of which are applicable to the resultant trained structure and operation of the example feature extractor 1430. The trained feature extractor 1430 may then be used in the face registering process and the facial verification process described above with respect to FIGS. 1-13.

The computing apparatus 120, camera 130, display 150, feature extractors 635 and 680, determiner 685, feature extractors 740, 750, 752, 754, 756, 758, 760, 762, 764, 766, 768, 770, 772, 774, 780, 782, and 784, facial verification apparatus 1200, processor 1210, memory 1220, database 1230, computing apparatus 1300, processor 1310, memory 1320, camera 1330, storage device 1340, input device 1350, output device 1360, and network device 1370, training apparatus 1400, processor 1410, memory 1420, and feature extractor 1430 in FIGS. 1-14 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile computing apparatus, comprising:
a camera configured to obtain a face image of a user;
a display configured to be observable by the user during the obtaining of the face image; and
a processor configured to generate a synthesized image by selectively combining image information of the obtained face image and reference image information, corresponding to missing portions determined from the obtained face image, of a predefined reference image, while maintaining image information of remaining portions of the detected face region and perform a facial verification based on the synthesized image before allowing the user to access the mobile computing apparatus that is in a lock state,
wherein the mobile computing apparatus in the lock state does not display the obtained face image to the user on the display while the facial verification is being performed using a neural network based facial verification model,
in response to the obtained face image being determined in the facial verification to correspond to the registered face image of the predetermined valid user, the mobile computing apparatus cancels the lock state and allows the user access to the mobile computing apparatus.

2. The mobile computing apparatus of claim 1, wherein the processor is configured to initiate the performing of the comparing of the obtained face image and the registered face image during the observance of the display by the user for the obtaining of the of the face image.

3. The mobile computing apparatus of claim 1, wherein, in response to the obtained face image including only partial face information of the user, the processor is configured to generate the synthesized image by the selective combining using the obtained face image and the predefined reference image based on a determined type of the partial face information, and perform the facial verification by comparing the synthesized image and a registered face image of a predetermined valid user.

4. The mobile computing apparatus of claim 1, wherein the computing apparatus not displaying the obtained face image to the user on the display while the facial verification is being performed includes not displaying the obtained face image to the user during the observance of the display by the user for the obtaining of the of the face image.

* * * * *